US005253934A

United States Patent [19]

Potucek et al.

[11] Patent Number: 5,253,934

[45] Date of Patent: Oct. 19, 1993

[54] L.E.D. ARRAY PRINTER WITH EXTRA DRIVER CHANNEL

[75] Inventors: Martin Potucek; Mary A. Hadley, both of Greece; Keith W. Agar, Henrietta; Jeffrey A. Small, Chili; Hieu T. Pham, Webster; Yee S. Ng, Fairport, all of N.Y.

[73] Assignee: Eastman Kodak Company, Rochester, N.Y.

[21] Appl. No.: 543,929

[22] Filed: Jun. 26, 1990

[51] Int. Cl.[5] ........................ G01D 15/14; G01D 15/00

[52] U.S. Cl. .................................. 346/107 R; 346/154

[58] Field of Search .............. 346/107 R, 154, 76 PH; 370/85.1; 364/159, 240.1

[56] References Cited

U.S. PATENT DOCUMENTS

| | | | |
|---|---|---|---|
| 3,850,517 | 11/1974 | Stephany et al. | 354/12 |
| 4,038,535 | 7/1977 | Aldridge et al. | 364/900 |
| 4,508,438 | 4/1985 | Kanaoka et al. | 354/105 |
| 4,598,358 | 7/1986 | Boddie et al. | 364/200 |
| 4,680,754 | 7/1987 | Fechalos | 370/85.1 |
| 4,746,941 | 5/1988 | Pham et al. . | |
| 4,750,010 | 6/1988 | Ayers et al. | 346/107 R |
| 4,799,071 | 1/1989 | Zeise et al. | 346/160 |
| 4,806,965 | 2/1989 | Yamanouchi et al. | 346/107 R X |
| 4,831,395 | 5/1989 | Pham et al. . | |
| 4,885,597 | 12/1989 | Tschang et al. . | |
| 4,952,949 | 8/1990 | Uebbing | 346/154 |

FOREIGN PATENT DOCUMENTS

| | | | |
|---|---|---|---|
| 0161949 | 12/1979 | Japan | 400/120 |

*Primary Examiner*—Benjamin R. Fuller
*Assistant Examiner*—David Yockey
*Attorney, Agent, or Firm*—Norman Rushefsky

[57] ABSTRACT

A non-impact printer apparatus is described that includes a recording head having a plurality of recording elements such as LED's for recording on a recording medium. A plurality of driver chips are provided on the head and each includes a plurality of current driving channels for selectively driving a plurality of recording elements in accordance with respective image data signals. The driver chips each further include an extra current driving channel not associated with a recording element for generating a current related to that sent to said recording elements. Monitoring of the current in the extra channel is provided to permit for changes of current to the recording elements and/or corrected image data to provide fine tuned control over uniformity of the recording elements.

29 Claims, 16 Drawing Sheets

| TDir | LD/RUN | |
|---|---|---|
| L | L | LOADING Rref DATA FROM RIGHT TO LEFT |
| L | H | LOADING IMAGE DATA FROM RIGHT TO LEFT |
| H | L | LOADING Rref DATA FROM LEFT TO RIGHT |
| H | H | LOADING IMAGE DATA FROM LEFT TO RIGHT |

L.E.D. ARRAY PRINTER WITH EXTRA DRIVER CHANNEL

CROSS REFERENCE TO RELATED APPLICATIONS

This application is related to the following applications filed on even date herewith:

1. U.S. application Ser. No. 07/543,892, filed in the names of Mary A. Hadley et al and entitled, "Non-Impact Printer Apparatus With Improved Current Mirror Driver;"

2. U.S. application Ser. No. 07/543,931, filed in the names of Yee S. Ng et al and entitled, "Non-Impact Printer For Recording in Color;"

3. U.S. application Ser. No. 07/543,891, filed in the name of Jeffrey A. Small and entitled, "L.E.D. Printer Apparatus With Improved Temperature Compensation;"

4. U.S. application Ser. No. 07/543,930 now U.S. Pat. No. 5,126,759, filed in the names of Jeffrey A. Small et al and entitled, "Non-Impact Printer With Token Bit Control of Data and Current Regulation Signals."

5. U.S. application Ser. No. 07/543,507, filed in the names of Michael W. Mattern et al and entitled, "L.E.D. Printhead With Improved Current Mirror Driver and Driver Chip Therefor."

BACKGROUND OF THE INVENTION

1. Field of the Invention

The present invention relates to non-impact printer apparatus for recording, and more specifically, to circuitry thereon for controlling signals flowing to a printhead forming part of the printer apparatus to control current uniformity to the recording elements.

2. Description of the Prior Art

In U.S. Pat. No. 4,831,395, an L.E.D. (light emitting diode) printhead is described wherein control of current to the LED's during recording is provided by a current mirror circuit. This circuit features an adjustable resistor and voltage supply to allow the respective currents to the LED's to be controlled so that adjustments may be provided to have the outputs of the LED's be more uniform. Where groups of LED's are driven from respective driver chips, each driver chip is separately adjustable so that LED's driven from this driver chip receive sufficient current so that their respective intensities are similar to that of LED's driven by other driver chips on this printhead. Another aspect of adjustability requires the LED's to put out sufficient light to expose the recording medium such as a photoconductor.

In U.S. Pat. No. 4,885,597, an LED printhead is described wherein compensation for age and temperature of the LED's is accommodated to ensure that the intensity from the LED's is consistent over time. In this printhead, current to the LED's is regulated using digitally addressable current mirrors associated with each driver chip. The multi-bit digital current regulation signals used must be communicated to the driver chips and adjustments in intensities of the LED's made accordingly. A problem with providing adjustability to current is that temperature is a localized matter with temperature being different from chip to chip and varying with time in accordance with demand for printing. Providing a few thermistors upon a printhead may not provide sufficient information relative to temperature that can be used to very accurately control uniformity. While adding more thermistors can increase accuracy doing so entails added expense both in materials and manufacturing cost for the printhead and still does not provide information relative to temperature inside the driver chip.

It is therefore an object of the invention to overcome this problem and to provide an improved printer apparatus with improved means for measuring localized temperature of the printhead and for providing for more prompt and fine-tuned correction of non-uniformities.

SUMMARY OF THE INVENTION

The above object and others which will become apparent in reading the specification below are realized by a non-impact printer apparatus that includes a recording head having a plurality of recording elements for recording on a recording medium; driving means including a plurality of current driving channels for selectively driving said plurality of recording elements in accordance with respective image data signals; the driving means further including an extra current driving channel not associated with a recording element for generating a current related to that sent to said recording elements; and means for monitoring the current in said extra channel. The above and other objects and features of the present invention will become apparent from the following description taken in conjunction with the accompanying drawings.

In accordance with another aspect of the invention, a non-impact printer apparatus is provided that includes a recording head having a plurality of recording elements for recording on a recording medium; driving means including a plurality of current driving channels for selectively driving said plurality of recording elements with a constant level of current in accordance with respective image data signals; means for sensing the level of current in an extra current driving channel; and means for adjusting the image data signals to the recording elements in response to the level of current sensed.

BRIEF DESCRIPTION OF THE DRAWINGS

The subsequent description of a preferred embodiment of the present invention refers to the attached drawings wherein:

FIGS. 4, 4A, and 4B comprise a block diagram of a driver chip made according to one embodiment of the invention and used on the printhead of FIG. 3;

FIGS. 5, 5A, and 5B comprise a circuit diagram of one circuit incorporated on the driver chip of FIGS. 4, 4A, and 4B in accordance with the invention.

DESCRIPTION OF THE PREFERRED EMBODIMENT

Because the apparatus of the type described herein are well known, the present description will be directed in particular to elements forming part of, or cooperating more directly with, the present invention.

Figure 1:
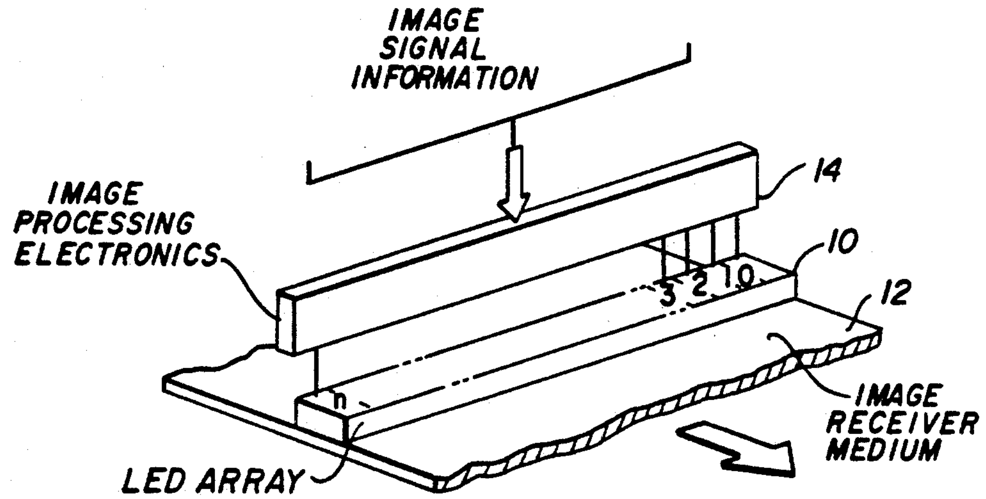
FIG. 1 (PRIOR ART)
FIG. 1 is a perspective view illustrating the general arrangement of a prior art non-impact printer.

The apparatus for the herein disclosed invention is typified by the diagram of FIG. 1; a linear array 10 of say 3584 triggerable recording elements; e.g. LED's, is disposed to expose selectively a photosensitive image-receiver medium 12 that is movable relative to the array by suitable conventional means (not shown). While the embodiments of the invention will be described in terms of LED printheads, other recording elements may also make use of this invention. Optical means for focusing the LED's onto the medium may also be provided. In this regard, gradient index optical fiber devices such as Selfoc (trademark of Nippon Sheet Glass Co., Ltd.) arrays are highly suited. The LED's of the array are triggered into operation by means of image processing electronics 14 that are responsive to image signal information. Depending on the duration for which any given LED is turned on, the exposure effected by such LED is more or less made. Where the medium 12 is, say, photographic film the latent image formed line by line by selective exposure of said LED's may be subsequently developed by conventional means to form a visible image. Where the medium 12 is an electrophotographic receptor, the LED's may be used to form an electrostatic image on a uniformly electrostatically charged photoconductor and this image developed using opaque toner particles and perhaps transferred to a copy sheet, see U.S. Pat. Nos. 3,850,517 and 4,831,395, the contents of which are incorporated herein by this reference.

Figure 2:
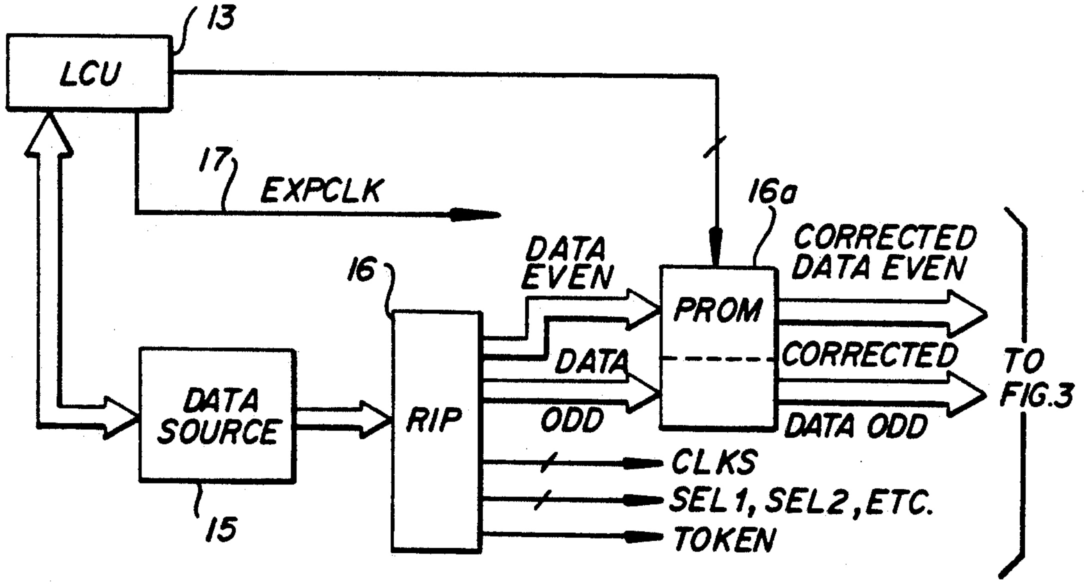
FIG. 2 is a block diagram of a circuit for providing signals to a non-impact printhead made in accordance with the invention.
Figure 3:
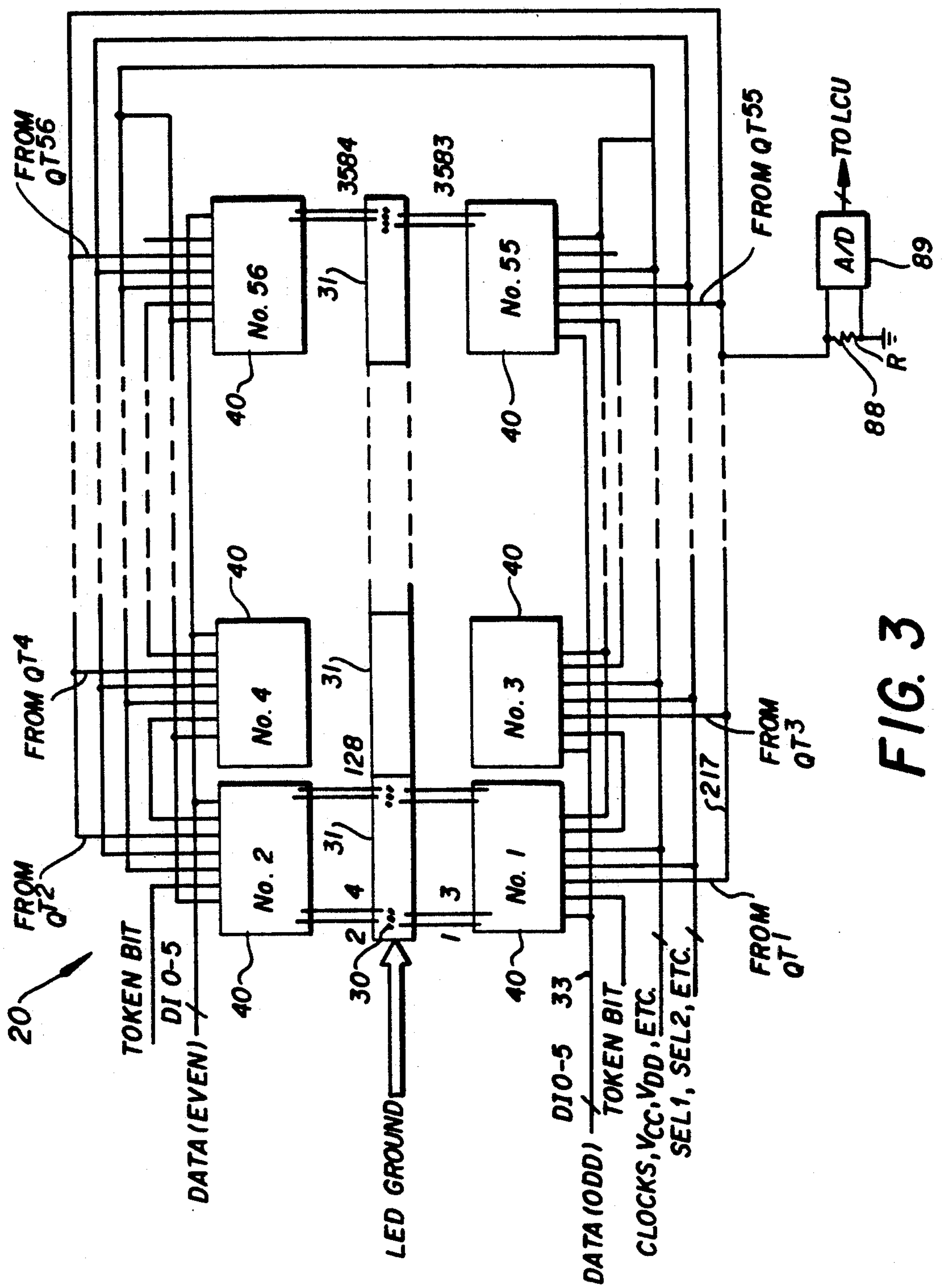
FIG. 3 is a block diagram of a printhead according to the invention, the printhead including a plurality of driver chips for driving the LED's formed on chip arrays.
Figure 4A:
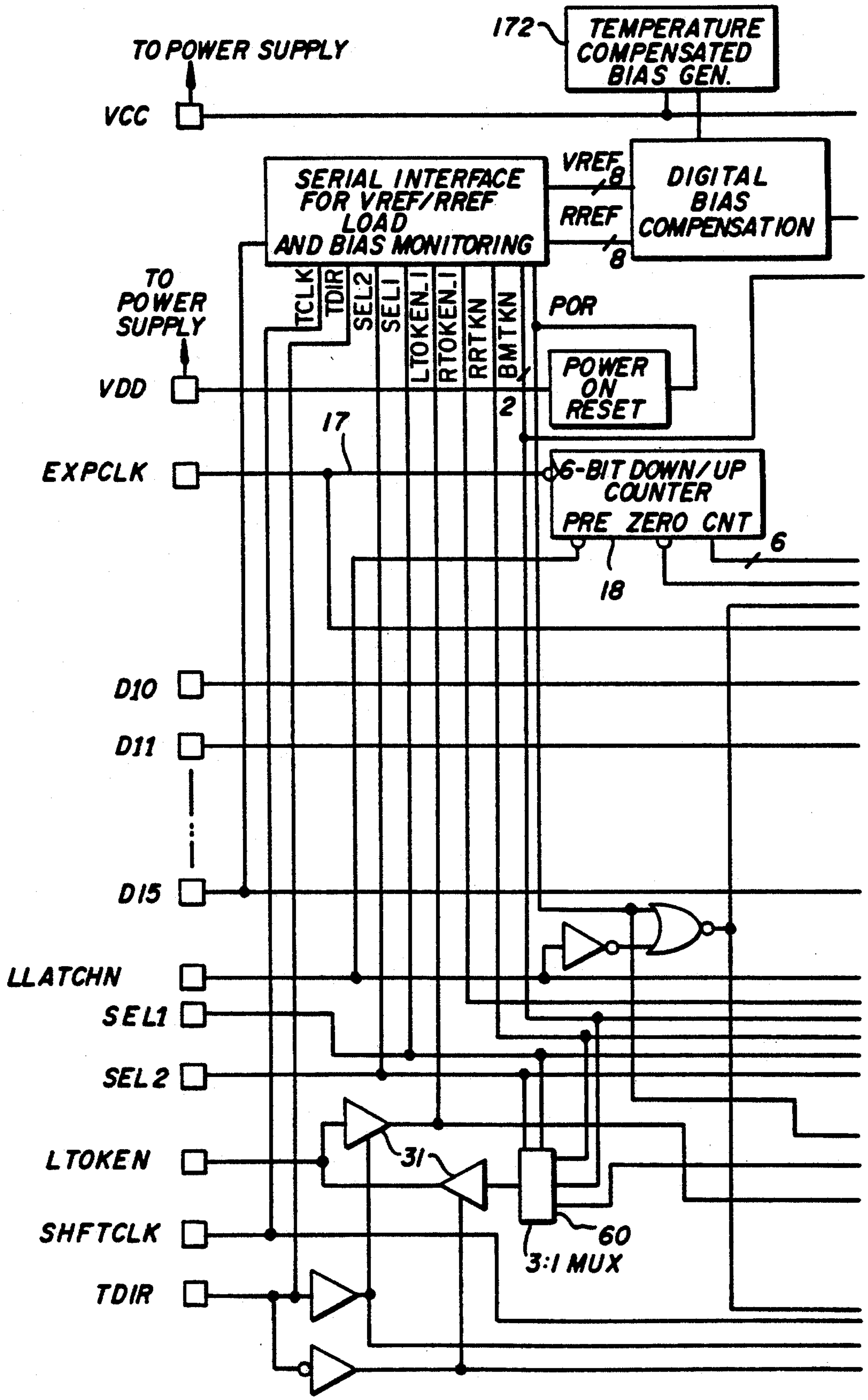
Figure 4B:
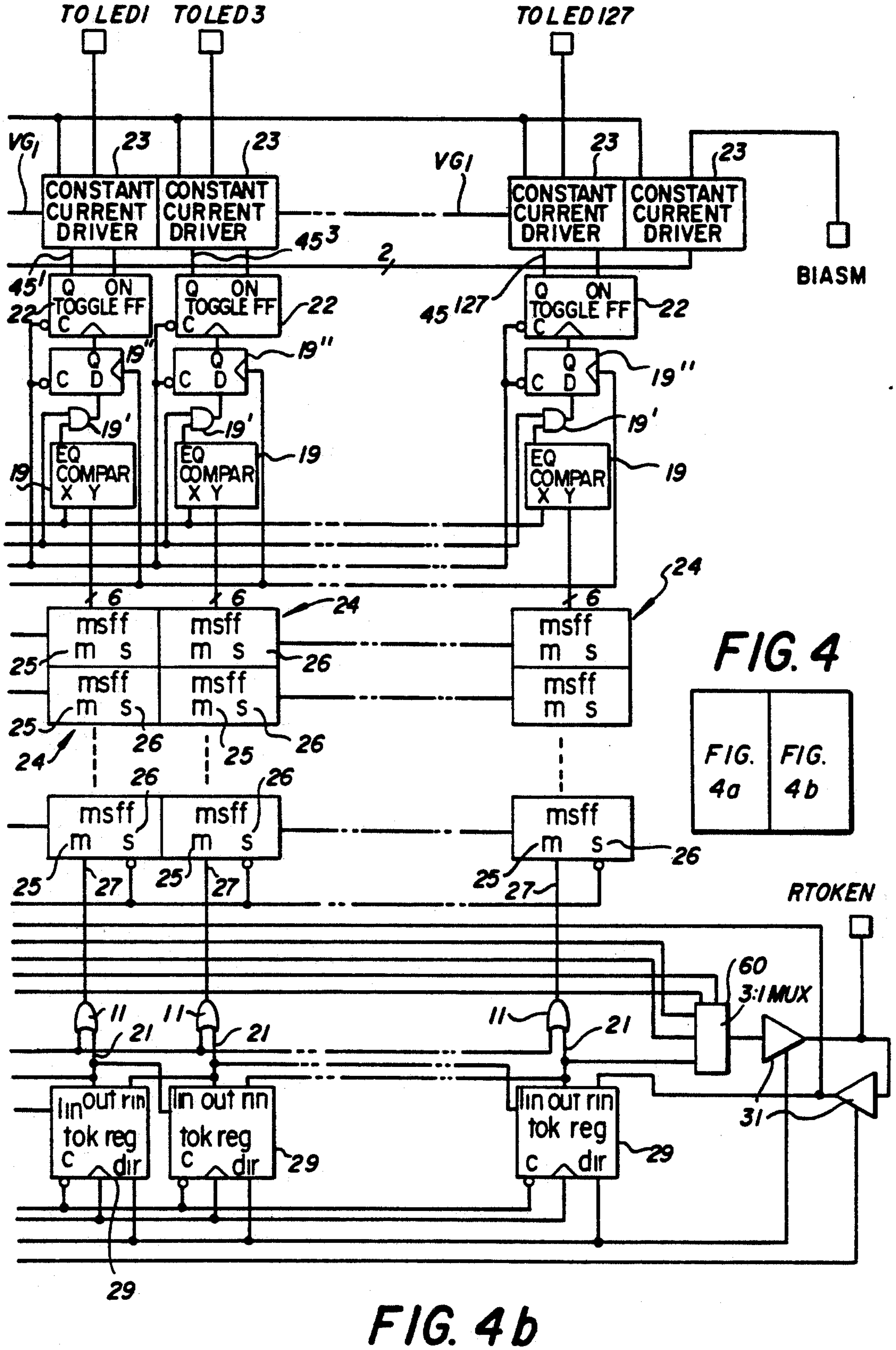

With reference now to FIGS. 2, 3, and 4, a data source 15 such as a computer, word processor, image scanner or other source of digitized image data, provides image data signals to a data processor 16 which may comprise a raster image processor. The data processor under control of clock pulses from a logic and control device (LCU) 13 provides a plurality of outputs including rasterized data outputs and control signals which are fed to the printhead. Data for each pixel may be represented by a multibit signal of say 4 bits representing a grey level for exposure for recording that pixel. A programmable ROM (PROM) 16*a* may be provided either on or off the printhead to modify the data to provide for uniformity correction from LED to LED. In this regard, see U.S. application serial No. 07/290,002, the contents of which are incorporated herein by this reference. The PROM transforms the 4-bit signal into a 6-bit grey level signal that is adjusted or corrected for the light-emitting characteristics of the respective LED. This balance in light output from LED to LED can be corrected by modifying the data bit signals in accordance with empirical determinations. The PROM has stored therein correction factors associated with each LED for modifying that LED's respective data. As will be described below, this PROM may be modified in accordance with age and/or temperature changes to the printhead. In addition, the LCU provides exposure clock pulses to a down/up counter 18 (FIG. 4) which, when enabled by a signal from the LCU, counts such clock pulses and provides at an output having a plurality of lines a digital signal representation of the state of the counter. Typically, such a counter has one line representing a least significant bit of such count and other lines representing other more significant bits. In accordance with a technique fully described in U.S. Pat. No. 4,750,010 in the names of Ayers et al, the contents of which are incorporated herein by this reference, the output of counter 18 is provided to a first set of input terminals to a comparator 19 associated with each recording element 30, i.e., LED in this embodiment. A plurality of data lines from each of a plurality of corresponding data registers 24 is also provided to a second set of input terminals associated with each comparator 19. The comparators 19 all compare the output of the counter 18 with the value of the respective data. As will be described herein, the image data signals provided to each comparator relates to a desired ON time or period of enablement for a respective LED 30 for the recording of a particular pixel. As is well known, the LED's are alternately divided into odd and even-numbered LED's so that respective integrated circuit driver chips 40 therefor are located on opposite sides of the line of LED's. As the circuitry is identical for the corresponding driver chips, the discussion herein will be made as to one of these driver chips. The image data signals provided to each comparator 19 during the printing of a single line of dots by the row of LED's is related to the desired pixel or dot size to be exposed onto the image receiver medium by that LED for that particular line of dots. As shown in FIGS. 3 and 4, six independent lines of data DI0 through DI5 provide a six bit digital image data signal that allows for grey-scale variation of the output of each LED during each cycle of operation. During each cycle the data to each comparator may comprise six binary bits representing an amount from decimal 0 to decimal 63. Although the data lines DI0 through DI5 are shown passing through the data registers 24 in FIG. 4, it will be appreciated that this is for the convenience of this illustration and that actually such lines comprise a plurality of data lines that are simultaneously available to all latches as will be described below.

Suppose, for example, that an LED, $LED_1$, is to be enabled for a time period equal to 20 clock periods plus $T_{MIN}$. $T_{MIN}$ represents a preestablished minimum LED on time. In response to a start pulse on line LLATCHN, the counter 18 is enabled and commences to count exposure clock pulses from line 17 from decimal 63 to 0. Note that the clock pulses may be generated to have a variable programmable period. The six bit output of counter 18 is coupled to one set of inputs at terminal X of each of the comparators. This count is now compared with the data input at another set of inputs at terminal Y of this comparator which represents in binary form decimal ten. When there is a "match," i.e., when the count of terminal X is 10, a pulse is provided at the output terminal of comparator 19 to cause latch or toggle flip-flop 22 to enable the constant current driver 23 to commence and maintain current to $LED_1$. After the counter counts down to zero, the counter may be inhibited from counting additional clock pulses for a period $T_{MIN}$ that is either programmed into the counter or provided by other suitable means. After this predetermined time period $T_{MIN}$, if used, the counter is set to count in its up mode and commences counting clock pulses again. When the counter, in its count up mode, reaches decimal 10 the flip-flop 22 is reset and current to the LED ceases. The other LED's, etc. operate in similar fashion but their data may require different count values to turn on and off. What these LED's will thus have in common is that all will have their respective current pulses centered, i.e., the midpoints of the respective current pulses will occur at the same time. The pulse duration for each LED during each line of print is varied, however, in accordance with their respective image data signals. Reference is also made to U.S. application Ser. No. 07/290,002, regarding a clocking scheme using a non-linear clock, the contents of which are incorporated by this reference. As noted in this latter reference, correction for unequal light output from LED to LED may be provided by adjustment of the data in accordance with the characteristics of each LED. Thus, a programmable read only memory device or PROM or other programmable device may store the characteristics of each LED and data for that LED can be modified to provide an input count at terminal Y that represents data modified by the exposure characteristics of the LED. For example, for an LED that is a relatively strong light emitter the PROM would modify data bits for that LED to reduce the count that otherwise would be provided at terminal Y based solely on the data.

Still other circuitry for balancing the driving current to the LED's is described below.

The description of the circuitry forming a part of the driving circuitry for distributing the image data signals to the appropriate comparator and to current driving circuits will now be described. In the example of the circuitry for the printhead shown in FIG. 3, the driving circuitry for the LED's are provided on opposite sides of the line of LED's 20. This is a known desirable arrangement for permitting LED's to be packed closer together to provide greater image resolution capabilities for the printer. As may be noted the circuit arrangement is an alternating one such that what may be called the even-numbered LED's have their respective driving circuitry located to one side of the line of LED's and what may be called the odd-numbered LED's have their respective driving circuitry located to the other side of the line of LED's. Typically, groups of, say, 64 of the odd numbered LED's (in a chip array 31 having 128 LED's arranged in a row) will have their respective driver circuitry formed in a single integrated circuit chip 40 and thus, for a printhead having 3584 LED's on the printhead, there may be 28 driver chips located on each side of the line of LED's. In order to save on production costs for these driver chips, it is desirable that they be identical. For the driver chips to be identical, although locatable on either side of the line of LED's, it is desirable for design simplicity that signals traversing the length of the printhead be programmably movable in either direction; see in this regard U.S. Pat. No. 4,746,941. LED chip arrays having more than 128 LED's are also known but the invention will be described with reference to those having 128 LED's.

The image data signals are output by the data processor 16 in accordance with image data signals for the odd-numbered LED's and image data signals for the even-numbered LED's. Discussion will now be made with regard to the image data signals for the odd-numbered LED's, since operation and circuitry for driving the even-numbered LED's is identical. With reference to FIG. 4, data lines DI0–DI5 are independent lines each carrying a signal representing a digital bit (0 or 1) so that together their respective signals define a digital six bit number from decimal 0 to decimal 63. This image data signal is passed along lines DI0–DI5 on the printhead which comprise an image data signal bus. Associated with each LED is a data register means 24 for latching data from this bus during each cycle of operation for printing a single line of dots or pixels. As will be described, a token bit is used to enable a data register means associated with a particular LED to accept the data while other data register means associated with other LED's await their respective data. The use of a token bit in a printer apparatus for controlling latching of multibit data is described in U.S. Pat. No. 4,746,941.

The data register means 24 for each LED comprises a pair of latches 25, 26 or bistable multivibrators (msff=master-slave flip flops) for each of the six data lines. The pair of latches are connected in a master-slave relationship wherein in response to a token bit signal at the enable input terminal of the master latch 25, an image data signal at the data input terminal of the master latch 25 will cause the output of the master latch to either change or remain the same depending upon the image data signal. It will be noted that the six master latches 25 in the data register means of each LED are commonly connected to a line 27 to simultaneously receive the token bit signal from the token bit shift register 28.

The token bit shift register 28 comprises a series of flip-flops 29 which have clock pulses (SHFTCLK) applied to the clock terminals thereof and the signal representing the token bit input to the data input terminal of each. Note that the same token bit signal will be provided to both the even and odd token bit shift registers for the even and odd numbered LED's. The output of each of these flip-flops 29 is connected to the data input terminal of the next flip-flop 29 in the series. Buffers 31 with enable inputs and direction controls are coupled to the token bit shift register 28 so that programmable control may be made of the direction for shifting the token bit along the token bit shift register 28. In the example where the token bit is to be shifted from left to right in FIG. 4 for the Data Odd half of the printhead, the signal line TDIR (token direction) is made at an appropriate logic level to allow the token bit on line LTOKEN to pass from left to right. Thus, in response to clock pulses from the data processor 16 the token bit is passed from stage to stage (left to right in FIG. 4) of the token bit shift register 28 and accordingly outputted sequentially over respective lines 21 through OR gates 11 to lines 27 for enablement of all the master latches 25 of a respective data register 24. With movement of the token bit from stage to stage of the shift register 28 the data bits occurring on lines DI0–DI5 are accepted by the data registers 24 in turn from left to right until all the 1792 data registers on this side of the printhead have acquired their respective six bits of data. A latch enable signal is then pulsed low on line LLATCHN to cause the respective slave latches 26 to latch the data at their respective outputs and to reset the toggle flip-flops 22. The respective outputs of the slave latches 26 are now communicated to the data input terminals Y of the respective comparators 19 for determining the duration of exposure for each LED in accordance with the techniques described above. The master latches 25 are now free to receive the image data signals for the next line of dots to be recorded.

The comparators 19 each have at an output an AND gate 191 and a D type flip-flop 1911 in order to prevent the propagation of extraneous logic glitches from the comparator outputs to the toggle flip-flop inputs.

After LLATCHN returns to its inactive level, on the first rising edge of EXPCLK while a particular comparator's 19 output is at a logic high level, the respective toggle flip-flop 22 toggles from the reset state to the set state. The Q and QN outputs of this toggle flip-flop then cause the associated controlled current driver 23 to be enabled. After this same comparator's output has been returned to a low logic level, and then returns to a high logic level on some later rising edge of EXPCLK, the respective toggle flip-flop 22 toggles back to the reset state. The Q and QN outputs of this toggle flip-flop then disable the associated constant-current driver 23.

Figure 6A:
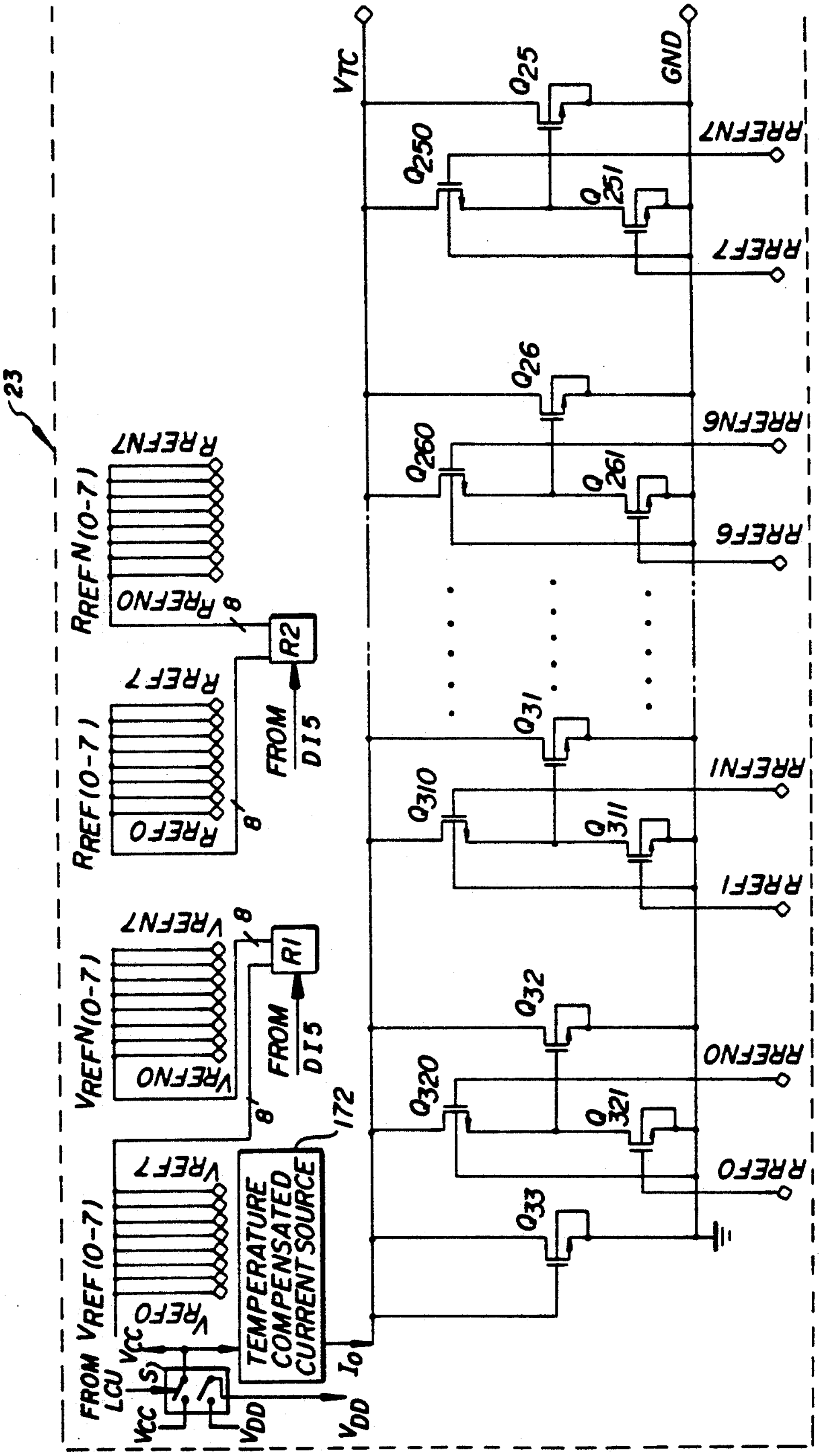
FIGS. 6A, 6B, 6C, and 6D comprise a schematic of a current driving circuit incorporated on the driver chip of FIGS. 4, 4A, and 4B.

With reference now to FIGS. 6A, B, C and D, the current driving circuit 23 portion of each driver chip 40 is shown. The respective outputs of the toggle flip-flops 22 are fed over respective lines $\mathbf{45}^1$, $\mathbf{45}^3$, and the following lines not shown $\mathbf{45}^5$, - - - $\mathbf{45}^{125}$ and $\mathbf{45}^{127}$. As may be seen each of these lines is actually a double line one of which carries an enable signal to turn the respective LED on and the other carries a complement of this signal. The lines $\mathbf{45}^1$ are input to respective control electrodes of transistors $Q_{426}$, $Q_{427}$. These transistors act as switches and form a part of a current mirror driving circuit that includes a master circuit formed by transistors $Q_{424}$, $Q_{425}$ and a series of digitally controlled transistors. More details concerning the digitally controlled transistors will be found below with reference to the discussion of FIGS. 6A and 6B. Briefly, these digitally controlled transistors may be selectively turned on to establish a signal I (CHIP BIAS) to thereby regulate a desired current level for the LED's driven by this driver chip. As may be noted in FIG. 6C, circuitry for driving two LED's, i.e., $LED_1$ and $LED_3$ are illustrated; it being understood that the driver chip would have appropriate circuits typified by those described below for driving say 64 of the odd-numbered LED's in an LED chip array having, for example, 128 LED's. Another driver chip on the other side of the LED chip array would be used to drive the 64 even-numbered LED's.

The current through the master circuit establishes a potential $V_{G1}$ on line 117. Directly in series with $LED_1$ are two transistors $Q_{428}$, $Q_{429}$. Transistor $Q_{428}$ is biased to be always conductive while transistor $Q_{429}$ is switched on and off and thus is the transistor controlling whether or not current is driven to $LED_1$. The gate or control electrode of transistor $Q_{429}$ is coupled to the drain-source connection of transistors $Q_{426}$, $Q_{427}$. When $LED_1$ is to be turned on, transistor $Q_{427}$ is made conductive and when $LED_1$ is to be turned off, transistor $Q_{426}$ is made conductive. The gate of transistor $Q_{426}$ receives a logic signal that is the inverse of that to gate $Q_{427}$ from a data driven enabling means 22 that is the circuitry of FIG. 4 which controls whether or not an LED is to be turned on and for how long. As noted above in a grey level printhead, the LED is to be turned on for a duration determined by the grey level data signals input to the printhead.

Also associated with the circuitry for driving $LED_1$, is an additional current mirror that includes two slave circuits. One slave circuit comprises transistors $Q_{420}$, $Q_{421}$ and $Q_{430}$. The other slave circuit comprises transistors $Q_{422}$, $Q_{423}$ and $Q_{431}$. Transistors $Q_{430}$, $Q_{431}$ are N-channel MOSFETS while the other transistors noted above are P-channel MOSFETS. The two additional slave circuits associated with $LED_1$ are on continuously and assuming a nominal driving current of say $ILED_4=4$ ma to $LED_1$, the current through transistor $Q_{421}$ might be 1/80 $ILED_1$ and the current through transistor $Q_{423}$ might be $1/800\times ILED_1$. The currents through these slave circuits establishes a voltage level $V_{G2}$ on line 114, which is the potential of the drain electrode of transistor $Q_{427}$.

In operation with transistor $Q_{429}$ turned off, transistor $Q_{426}$ is on and impresses approximately the voltage $V_{cc}$ at the gate of transistor $Q_{429}$. When $LED_1$ is to be turned on to record a pixel (picture element), a signal is provided by the data enabling means 22 to the gate of transistor $Q_{427}$ to turn same on, while an inverse signal turns transistor $Q_{426}$ off. Before transistor $Q_{429}$ turns on, the capacitive load or change existing between its gate and substrate must be removed. When transistor $Q_{427}$ turns on, the charge on the gate terminal of transistor $Q_{429}$ discharges through transistors $Q_{427}$ and $Q_{430}$. This path for discharge of the gate capacitive load at transistor $Q_{429}$ thereby provides a turn-on time not affected by the number of LED's that are sought to be simultaneously energized. The reason for this is that each control transistor corresponding to transistor $Q_{429}$ has its own respective path for discharge of its respective capacitive load. While the illustrated embodiment shows use of the additional current mirror circuit containing transistor $Q_{430}$ for use in discharging the control electrode of the driving transistor, it will be understood that in some circuit arrangements, charging, rather than discharging, of the control electrode may be facilitated.

Current through transistors $Q_{422}$, $Q_{423}$ and $Q_{431}$ is proportional to, i.e. mirrors, that through the master circuit because of the identical gate to source terminal biasing ($V_{GS1}$) of transistors $Q_{424}$ and $Q_{422}$. Thus, current is constant in this slave circuit even though $V_{cc}$ from power supply $P_2$ varies since the potential difference $V_{GS1}$ between the gate and source terminal of transistor $Q_{422}$ remains constant. The current through the circuit comprised of transistors $Q_{422}$, $Q_{423}$ and $Q_{431}$ is mirrored by that through the slave circuit comprised of transistors $Q_{420}$, $Q_{421}$ and $Q_{430}$ due to the identical gate to source biasing of transistors $Q_{430}$, $Q_{431}$. With a constant current being generated in the slave circuit comprised of transistors $Q_{420}$, $Q_{421}$ and $Q_{430}$, the potential difference between the gate and source terminals of transistor $Q_{420}$ remains fixed as does that of transistor $Q_{421}$ thereby establishing a voltage level $V_{G2}$ on line 114 which varies with $V_{cc}$ although the potential difference $V_{cc}-V_{G2}$ remains constant.

With the transistor $Q_{429}$ turned on and conducting driving current to $LED_1$ during an exposure period, the voltage level $V_{G2}$ is established at the gate of transistor $Q_{429}$ via now conducting transistor $Q_{427}$. The voltage level at the source terminal of transistor $Q_{429}$ is now at a fixed threshold value above that of $V_{G2}$. Transistor $Q_{429}$, acting as a cascode transistor and having its source terminal connected to the drain terminal of transistor $Q_{428}$, thereby establishes the drain potential of the transistor $Q_{428}$ as varying with changes in $V_{cc}$. As noted above, the potential difference $V_{GS1}$ is constant even though $V_{cc}$ itself varies. The voltage relationships between the various terminals of transistor $Q_{428}$ are not affected by variations in $V_{cc}$ and the current to $LED_1$ during a period for recording a pixel stays constant.

Thus, stability in driver current to $LED_1$ is provided since transient changes in $V_{cc}$ do not cause corresponding changes to the current conducted through $LED_1$ and thus do not affect the intensity level of light output by $LED_1$. The tendency in some LED printheads for light output of an LED to diminish when other LED's are turned on can also be reduced with this circuit. As noted above, transistor $Q_{429}$ conducts current to $LED_1$ for a time period controlled by the data bits for recording an appropriate pixel. The level of current for recording this pixel is controlled by the current mirror which is responsive to the current level I(CHIP BIAS). The circuit for generating I(CHIP BIAS) will now be described.

Figure 6B:
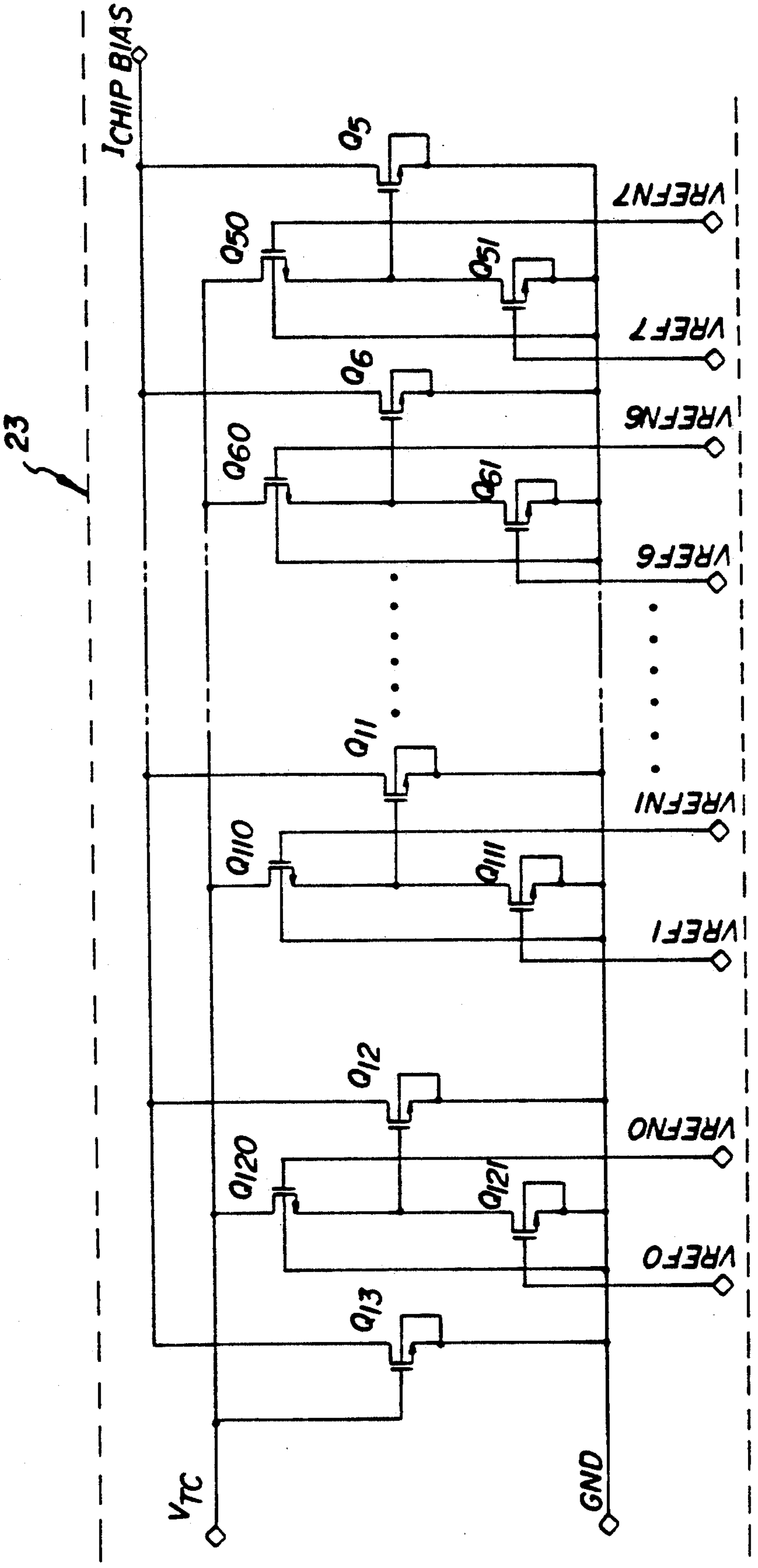
Figure 6C:
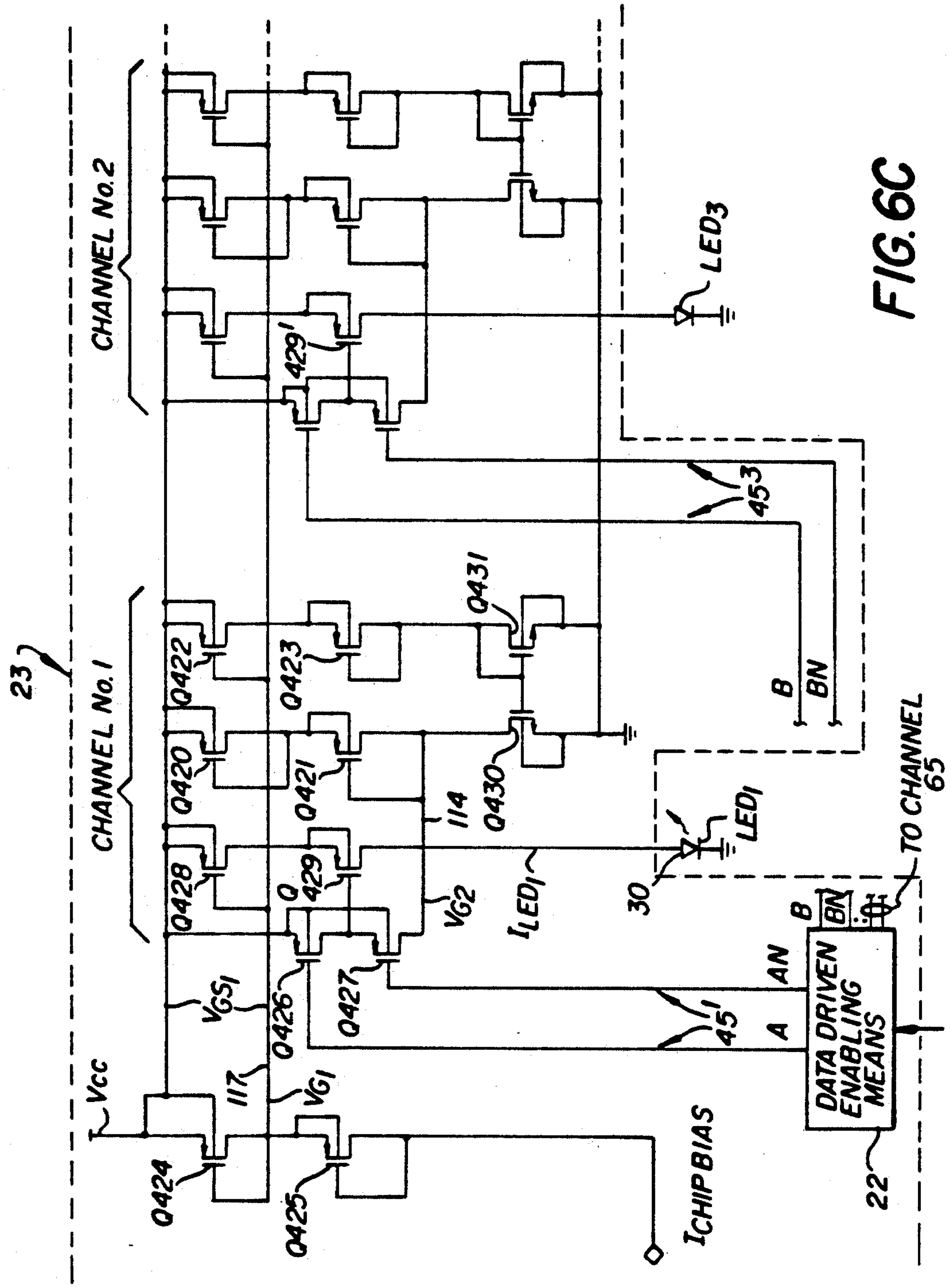

When transistor $Q_{429}$ is turned on, the current passing there through mirrors, i.e., is either the same or proportional to, the current passing through transistor $Q_{425}$. The current passing through transistor $Q_{425}$, in turn, is equal to I(CHIP BIAS). With reference now to FIGS. 6A and 6B, this current, I(CHIP BIAS) in turn is controlled by three factors comprising a temperature compensated current source 172, a first group of eight digitally controlled NMOSFET transistors $Q_{25}, Q_{26} \ldots Q_{31}$, $Q_{32}$ and a second group of eight digitally controlled NMOSFET transistors $Q_5, Q_6 \ldots Q_{11}, Q_{12}$. Associated with the first group is a non-digitally controlled NMOSFET transistor $Q_{33}$. Similarly associated with the second group is non-digitally controlled NMOSFET transistor $Q_{13}$. As may be noted in FIGS. 6A and 6B, not all of the transistors are shown and the number of digitally controlled transistors provided in each group determines the level of control. Transistors $Q_{25}, \ldots Q_{32}$ are parallel connected transistors whose respective gate width to gate length ratios are scaled so that their respective currents are scaled or weighted in powers of two. For example, where eight digitally controlled transistors are provided for this first group ($Q_{25}$–$Q_{32}$), respective gate width to gate length ratios may be $$\frac{256}{5} : \frac{128}{5} : \frac{64}{5} : \frac{32}{5} : \frac{16}{5} : \frac{8}{5} : \frac{4}{5} : \frac{2}{5} \text{ and } \frac{321.5}{5}$$

for non-digitally controlled transistor $Q_{33}$.

Each digitally controlled transistor is controlled by a logic signal applied to a respective two-transistor switch circuit associated with the transistor. For example, the circuit defined by NMOSFET transistors $Q_{250}$ and $Q_{251}$ cause current to flow through transistor $Q_{25}$ when a high level logic signal is applied to the gate of transistor $Q_{250}$ and a complementary low logic signal is applied to the gate of transistor $Q_{251}$. The logic signals for controlling which of the current-carrying transistors are to be turned on are controlled by a register R which stores an 8-bit digital word and its 8-bit complement representing a desired current control signal to turn on respective ones of the eight current conducting transistors $Q_{25} \ldots Q_{32}$. In conjunction with transistor $Q_{331}$ which is on continuously, this group of transistors is used for "localized" control of LED current. By this, it is meant that the digital word stored in register $R_2$ is specific for this driver chip and will be determined by adjustment of driver current to the LED's driven by this driver chip until the LED's each provide a desired light output level. This digital word may be input to the register R2 from memory in the LCU or from a separate memory such as a ROM provided on the printhead. This digital word may also be changed in response to the temperature of the driver chip as will be described below. Briefly, the level of current from an extra current mirror channel (#65) on each driver chip is used as a measure of temperature. A voltage generated by this current is digitized and compared by the LCU with a value based on the digital words in register R1 and R2. In response thereto, the LCU "writes" a new digital word into register R2, if a change in current level is required according to an algorithm stored in memory. At start-up, the LCU is programmed to provide or default to a particular set of digital words for placement into registers $R_1$ and $R_2$.

As noted in aforementioned U.S. Pat. No. 4,831,395, the contents of which are incorporated by this reference, the LCU may be programmed to maintain a count of prior activations of each LED and adjust a control voltage according to a program based on the aging characteristics of the printhead.

After this initial calibration and as the printhead ages through repeated use, both temperature and age factors operate to degrade light output. The affects due to aging will generally be similar to all LED's and are corrected for by adjustment of an 8-bit digital word and its 8-bit complement stored in register $R_1$.

This digital word controls 8 current-carrying NMOSFET transistors $Q_5, \ldots Q_{12}$. Associated with this group of transistors is a continuously conducting NMOSFET transistor $Q_{13}$. Exemplary gate width to length ratios for weighted digitally controlled transistors $Q_5$–$Q_{12}$ are $$\frac{896}{5} : \frac{448}{5} : \frac{224}{5} : \frac{112}{5} : \frac{56}{5} : \frac{28}{5} : \frac{14}{5} : \frac{7}{5} \text{ and } \frac{4027}{5}$$

for non-digitally controlled transistor $Q_{13}$. The 8-bit word and its 8-bit complement stored in register $R_1$ is the same as that stored in identical registers $R_1$ on the other driver chips. As the printhead ages, a new 8-bit digital word and its 8-bit complement is calculated by the LCU and input into the registers $R_1$. The calculation of this 8-bit word for aging may be based on empirical determinations made using similar printheads or based upon a calibration of this printhead using an optical sensor that senses the output from each or selected LED's or by sensing patches recorded on the photoconductor.

As noted above, a third factor for adjustment to maintain LED uniformity of light output from chip-to-chip is a temperature-compensated current source 172. This current source includes a temperature sensor and circuitry which will assist in boosting current to the LED's in response to increases in temperature. Various circuits for accomplishing this are well known for example, see Gray and Meyer, Analysis and Design of Analog Integrated Circuits, 2nd edition, pages 733–735 and FIG. 12.28, the contents of which are incorporated by this reference. In this text description is provided of so-called $V_T$ (thermal voltage) referenced current sources. By providing in such a circuit a resistor with an appropriate temperature coefficient, an output current, $I_o$, is provided that increases with an increase in temperature of the driver chip.

The operation of the circuit of FIGS. 6A, B, C, and D will now be described. During use of the printhead the temperature of the driver chips will heat up differently in accordance with respective current carrying demands and abilities to dissipate heat caused by such demands through heat conducting structure to which the chips are mounted. The temperature adjusted current $I_o$ is conducted to ground via NMOSFET transistor $Q_{33}$ and some or all or none of the transistors $Q_{32}$, $Q_{31}$, . . . and $Q_{25}$ depending upon the digital 8-bit signal and its 8-bit complement stored in register $R_2$. In accordance with which transistors in this group of transistors are enabled to conduct and recalling that these transistors are scaled or weighted differently in conducting capabilities the voltage level at the source terminal of $Q_{33}$ is determined. Note that switching transistors are associated with each of these digitally controlled transistors. For example, transistor $Q_{25}$ is controlled by switching transistors $Q_{250}$ and $Q_{251}$ in response to a signal causing $Q_{250}$ to conduct and $Q_{251}$ to turn off. The others are controlled similarly. This voltage level, $V_{TC}$, is also applied to the gate of transistor $Q_{13}$ and thereby controls the current conducted by transistor $Q_{13}$. As noted above, transistor $Q_{13}$ is the non-digitally controlled transistor associated with the digitally controlled transistor group $Q_5$, . . . $Q_{11}$, $Q_{12}$. In accordance with the digital word stored in register $R_1$ selected ones of these transistors are caused to conduct thereby affecting the bias current level I (CHIP BIAS) through PMOSFET transistor $Q_{425}$. Recall that the transistors in this group of transistors also have scaled or weighted current-conducting capabilities. The current through PMOSFET transistor $Q_{425}$ is equal to the current conducted by the master circuit comprised of transistor $Q_{424}$, which current is replicated or scaled by current mirrors of PMOSFET slave transistors $Q_{429}$ and $Q_{429}$, . . . etc., i.e., the current controlling transistors to $LED_1$, $LED_3$ - - -$LED_{127}$, respectively, as well as the extra temperature sensing circuit using channel 65. Transistor $Q_{429}$ is caused to conduct when its respective logic transistors $Q_{426}$, $Q_{427}$ are appropriately signaled by data signals indicating a pixel to be printed. Thus, when a logic low signal is applied to line 45[1] (AN) transistor $Q_{427}$ turns on and biases the gate of transistors $Q_{429}$ to the level $V_{G2}$. Since transistors $Q_{424}$ and $Q_{428}$ have identical biasing, the current through transistor $Q_{429}$ will mirror or be scaled to that of transistor $Q_{424}$ for the time period for exposing a pixel as controlled by the duration of the logic low signal on line 45[1] (AN). As is noted in FIG. 6C, the current through $Q_{429}$ is fed to $LED_1$, for the recording of a pixel. Identical current levels will be developed in the other channels directly providing current to respective other LED's. Thus, all LED's driven by this driver chip receive the same current for periods determined by their respective enablement signals and the currents thereto are appropriately adjusted to maintain constant the intensity of the LED's.

Figure 5A:
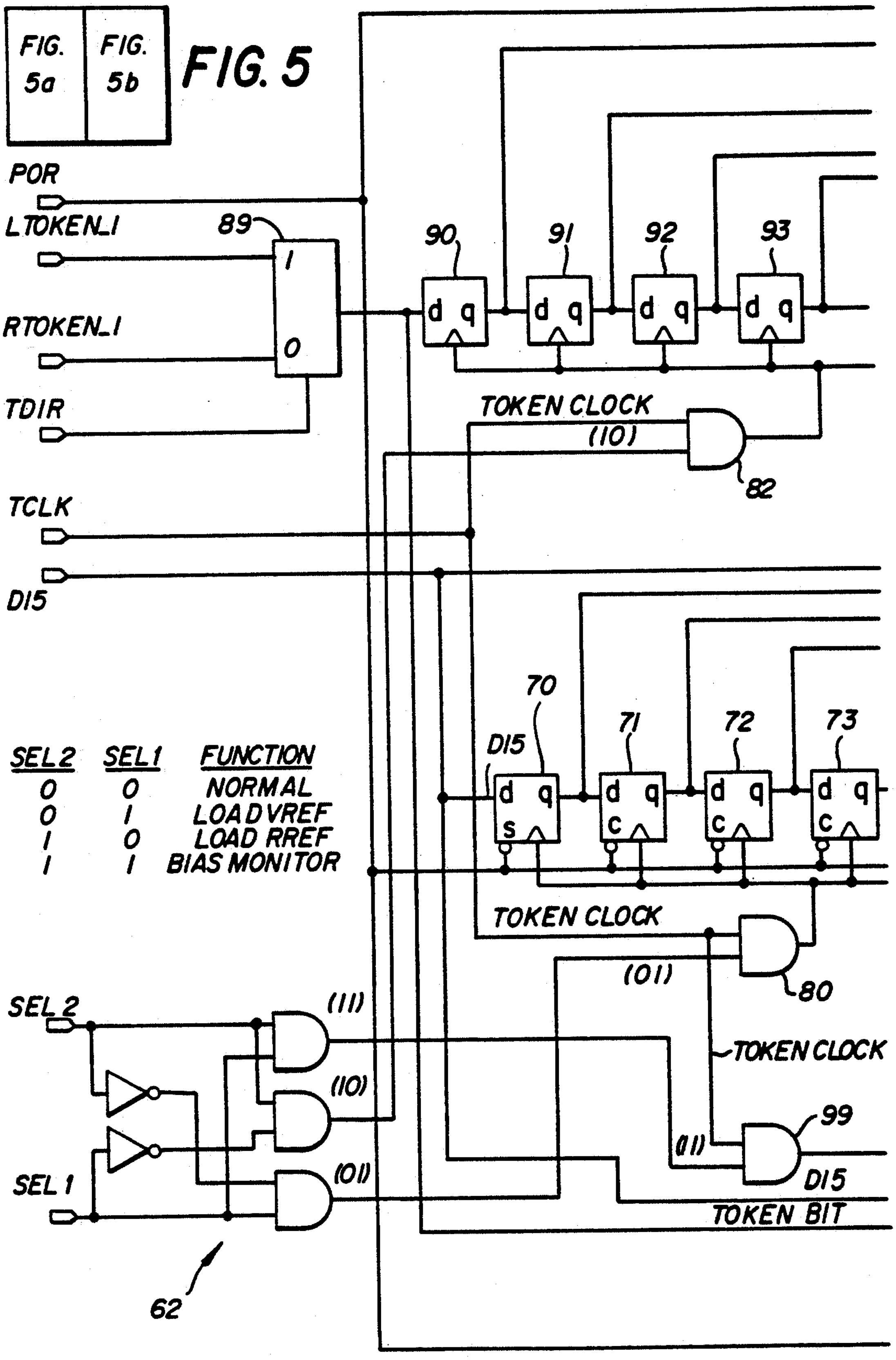
Figure 5B:
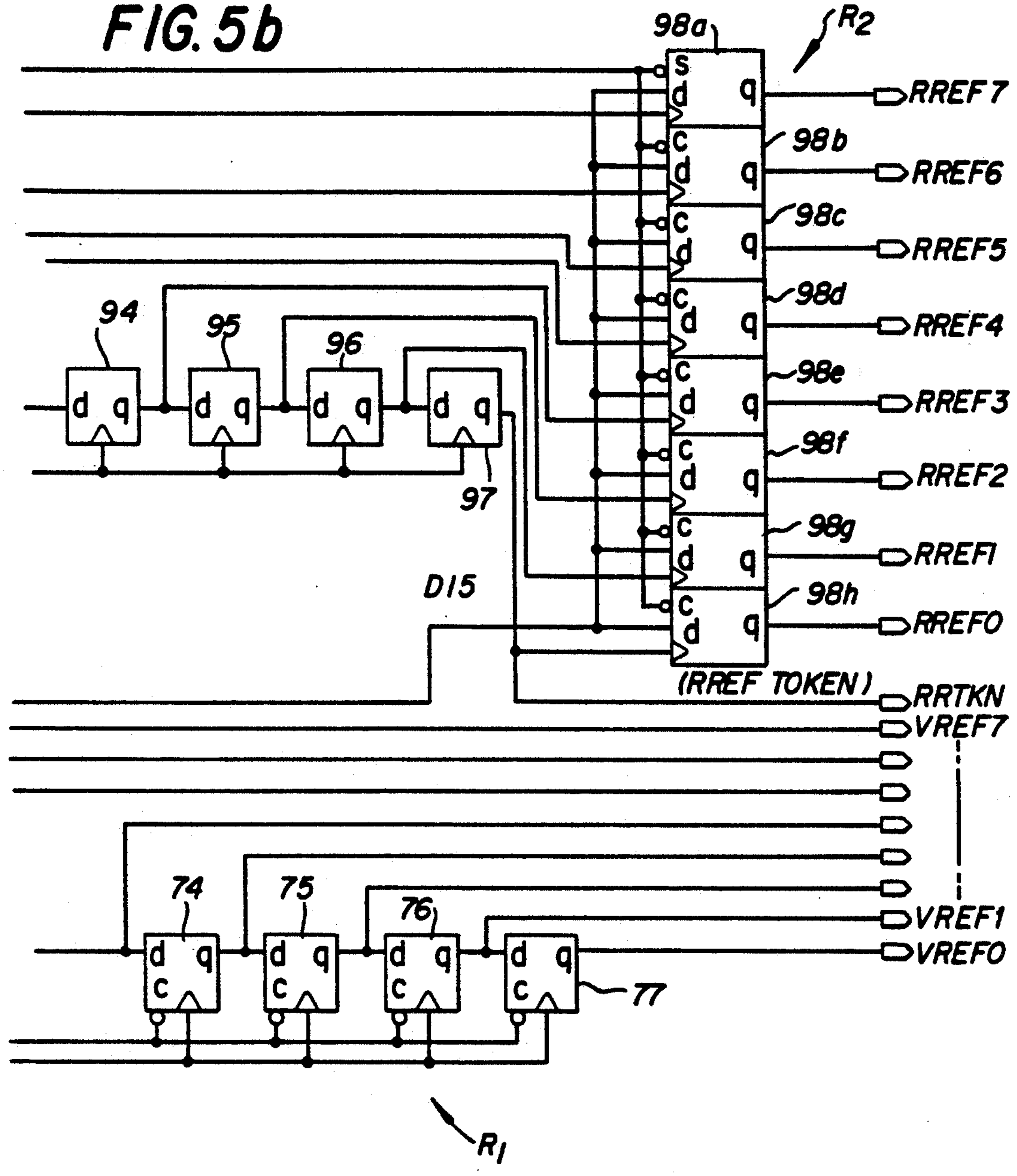
Figure 5B:
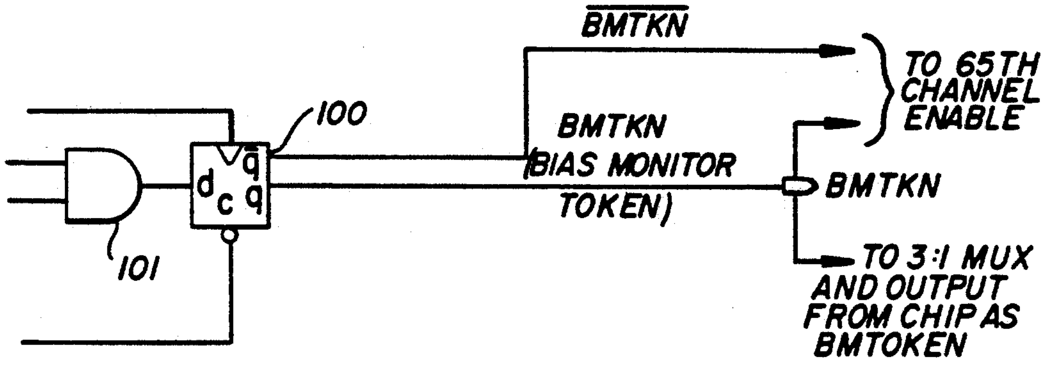

With reference now to FIGS. 4 and 5, description will now be provided of circuitry using the token bit and image data lines for purposes of regulating current to the LED's. As noted above, current to the LED's is controlled using digital words stored in registers $R_1$ and $R_2$. In order to minimize the number of lines going to the printhead and the number of connections of wires required to be bonded in fabricating a printhead having a multitude of driver chips, the token line used for latching image data as described above will also be used for latching current data to the various driver chips.

In FIGS. 4 and 5, lines SEL1 and SEL2 establish a two-bit selection of four possible operating modes of the token system. As noted in the chart accompanying FIG. 5, the options for these modes include a normal mode; i.e., one where the token is used for controlling image data to the appropriate registers 24 for latching image data; a load $V_{REF}$ mode wherein the digital current regulation word for loading register $R_1$, the global bias, is established; a load $R_{REF}$ mode wherein the digital current regulation word for loading register $R_2$, the local bias, Is established. The fourth mode is referred to as a bias monitor mode and is used to check on the level of current sent to the LED's by sequentially operating channel 65 of each driver chip.

The use of the token bit for image data has been described above and is made when the "00" two-bit signal is established by the LCU at the inputs (SEL 2, SEL 1) of the 3:1 multiplexers 60 and the logic device 62 which forms a part of the circuitry of FIG. 5 referred to as the "serial interface for $V_{REF}$/$R_{REF}$ loading and bias monitoring." As noted in FIG. 5, the logic set may be in the form of interconnected logic AND gates. With a "00" signal, this serial interface is disabled. Data over lines DI0–DI5 is then appropriately latched by the master image data flip-flops 25 in registers 24 as described above during shifting of the token bit over the token line LTOKEN and token registers 29. Data is then transferred in accordance with the techniques described above to control the duration of on-time for recording respective pixels.

After a period of use of the LED printhead there may arise, due to aging of the printhead, a need to adjust the current to all the LED's. Thus, a global bias adjustment is called for by the LCU in response to a determination by the LCU that the criterion for the need for such adjustment is met. Such a criterion may be a count of printing activations or time. In this regard, reference may be made to U.S. Pat. No. 4,799,071. In response, the LCU provides a signal "01" to lines SEL2, SEL1 during a non-production interval, as well as calculates, in accordance with an updating formula based on empirical data determined from aging this or similar printheads, an updated 8-bit digital word to be transmitted to all the driver chips. This updated current regulating data is transmitted serially over a single line DI5 of the image data bus (DI0–DI5) to the data input of a series of cascaded flip-flop registers 70–77 which form on each driver chip the register $R_1$ for storing signals $V_{REF(0-7)}$. The data over DI5 is shifted through these registers 70–77 in response to the token clock (TCLK) operating through an AND gate 80. Since DI5 is a line forming a part of the data bus the signal on line DI5 is available to all the driver chips and is latched simultaneously by the other driver chips. Thus, the $R_1$ registers of all driver chips are loaded simultaneously with the current control data signals $V_{REF(0-7)}$ in the above manner.

In order to load the "localized" current regulation signals $R_{REF(0-7)}$ into registers $R_2$, the LCU provides a "10" signal to SEL2 and SEL1. This enables latches 90–97 to be responsive to the token clock through AND gate 82. The token bit carried on line LTOKEN is input via direction control gate 87 to latch register 90 and then shifted through associated latches 91–97 in response to the token clock signal TCLK. The respective outputs of latches 90–97 are input to the clock inputs of registers $R_2$ storing the $R_{REF(0-7)}$ signals. As the token bit shifts through latches 90–97, the data on line DI5 is latched by the token bit in latches 90–97, into the respective flip-flops 98*a–h* that comprise registers $R_2$. At any one time only one of the registers forming $R_2$ is enabled by the token bit and that register gets to latch the data currently on DI5. Note that DI5 is commonly connected to the data inputs of all the registers forming $R_2$. After being shifted down the latches 90–97, in response to the token clock the token bit is shifted out of this driver chip ($R_{REF}$ token) and into an adjacent driver chip for latching DI5 into the $R_2$ register flip-flops for the current drivers in the next driver chip and so on. Thus, the current control data from the LCU for register $R_2$ is specific or local to each driver chip even though this data is carried on a data line of an image data bus that is commonly connected to all the $R_2$ registers of the driver chips located on one side of the row of LED's.

Description will now be provided of the fourth mode of operation which is called "bias monitor." In this mode, current from an extra or 65th current driver channel on each driver chip is monitored by the LCU. In this mode, monitoring is done to determine whether or not an acceptable current level is being provided by the current drivers and therefore whether or not the power to the printhead should be effectively shut down or adjusted to avoid damage or to better control output of the LED's. Additionally or alternatively, the monitoring of current serves to provide an indication of LED temperature and is useful to provide for a determination of when data should be modified to correct for loss of intensity of light output by the LED's as they heat up during use. Although the use of $V_{REF}$ and $R_{REF}$ adjustments are used to control the level of current to the LED's driven by a particular driver chip, finer control can also be provided by control also of the pulsewidth duration of the LED's through correction of image data.

One example of a problem situation that is monitorable is where a cooling fan for the printhead fails and the temperature of the printhead rises during printing. The current level detected serves as a measure of temperature and when compared with the digital words stored in registers $R_1$ and $R_2$ indicates that a problem exists; i.e., the current level being generated is not within an expected range based on the control signals stored in registers $R_1$ and $R_2$.

Figure 6D:
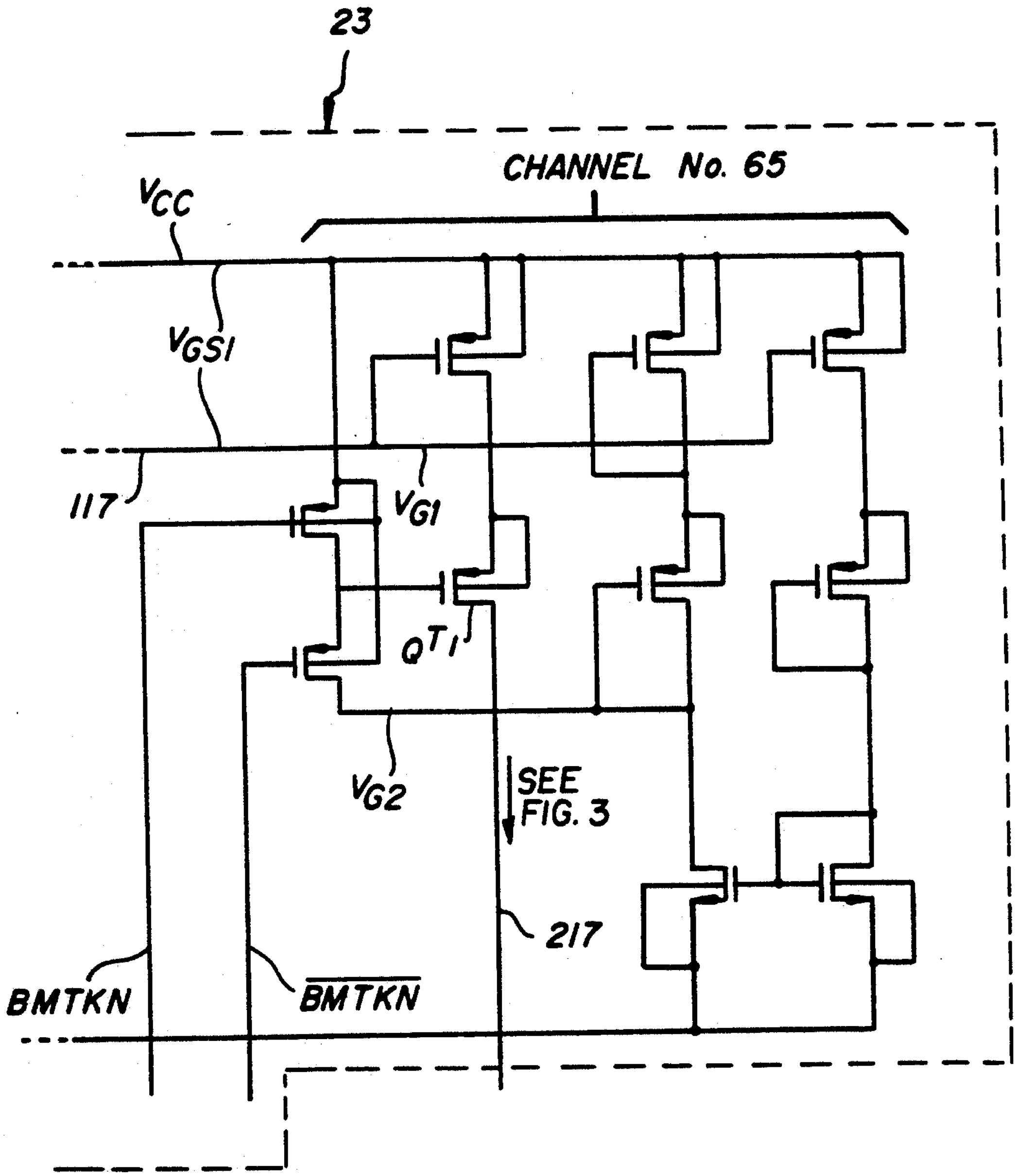

In the bias monitor mode, the LCU provides a signal "11" to lines SEL1 and SEL2. This causes the token clock to be clocked through AND gate 99 to enable a bias monitor register 100 which receives at its "D" input an output from a logic AND gate 101 which has as its inputs the token bit and a single bit "data" signal on data line DI5, representing whether or not the LCU is calling for monitoring of the current on this driver chip. Recall that line DI5 is available to all driver chips (of the odd-numbered driver chips) but it is the token bit that is shifted from driver chip to driver chip that determines which driver chip is to latch this data into its respective register. Assuming that the token bit has latched a logic high level into this register 100, the outputs (regular and inverse) of the register 100 are switched and enables transistor $Q^{T1}$ (FIG. 6D) which controls current through a calibrated temperature stable fixed resistor R (FIG. 3) that is commonly connected to the respective transistors $Q^{T1}$, $Q^{T3}$, $Q^{T55}$ of all driver chips located on one side of the row of LED's. The voltage level across the resistor R, 88, is related to the current on line 217 provided by transistor $Q^{T1}$ and this voltage level is sensed and converted by an analog to digital converter 89. A digital representation of this voltage signal is fed back to the LCU. The LCU, in accordance with a program stored therein and knowing the digital words stored in registers $R_1$, $R_2$, determines if the current is at an appropriate level in that chip. One possible response by the LCU may be to remove power to the printhead by opening a suitable switch to the power supply supplying the printhead such as removing voltages $V_{cc}$ and $V_{DD}$ to the current source 172 via switch S (FIG. 6A). Note that because of the similar circuitry in channel 65 to that for the other driver channels on that chip, the current in channel 65 is similar to that of such other channels and thus is a measure of current that will flow to each LED for which the corresponding driver channel is enabled. The entering of the bias monitor mode is advantageously done after $V_{REF}$ and/or $R_{REF}$ changes have been made to allow the LCU to determine that a safe and/or appropriate level of current to the LED's will be provided. Thus, the LCU is programmed to enter this calibration mode after such changes and on any power-up operation or during an interframe. Assuming that sufficient time exists during recording this mode can also be entered during recording or during an interline time period.

Alternatively, the LCU may be programmed to provide current regulation data to the printhead to lower the current level until a safe level of current is detected. If none is detected, then the shutdown signal is generated to remove power to the printhead. The LCU in this mode may count the token clock pulses and is thus able to determine which of the driver chips has the unsafe level of current. Since the voltage signal sensed by the A/D converter is also related to the temperature of the LED's driven by that driver chip such signal may also be used by the LCU to provide fine adjustment of current to the LED's by changing the 8-bit local current regulating signal $R_{REF}$ stored in registers $R_2$ in response to an algorithm relating temperature measured with signals to be fed to a respective driver chip's registers $R_2$. The signal relative to temperature may also be used to adjust the data signals to regulate or correct the on-time of the LED's using pulsewidth modulation. As noted above, the LCU may calculate a new correction program based on the fall off of intensity with temperature for the LED's. This new program is then input to the PROM 16*a* to adjust the corrected data sent to the printhead.

Note that the 65th channels on the even driver chips are also commonly connected to the input of the A/D converter 89 (FIG. 3). A reading of the voltage generated by a respective 65th driver channel on say an even-numbered driver chip is determined by having a logic high signal on the DI5 line on the even side with a corresponding low level signal on the DI5 line on the odd side since logic AND gate 101 (FIG. 5) on each driver chip passes the token bit only when the respective (odd or even) DI5 line is logic high.

Figure 8:
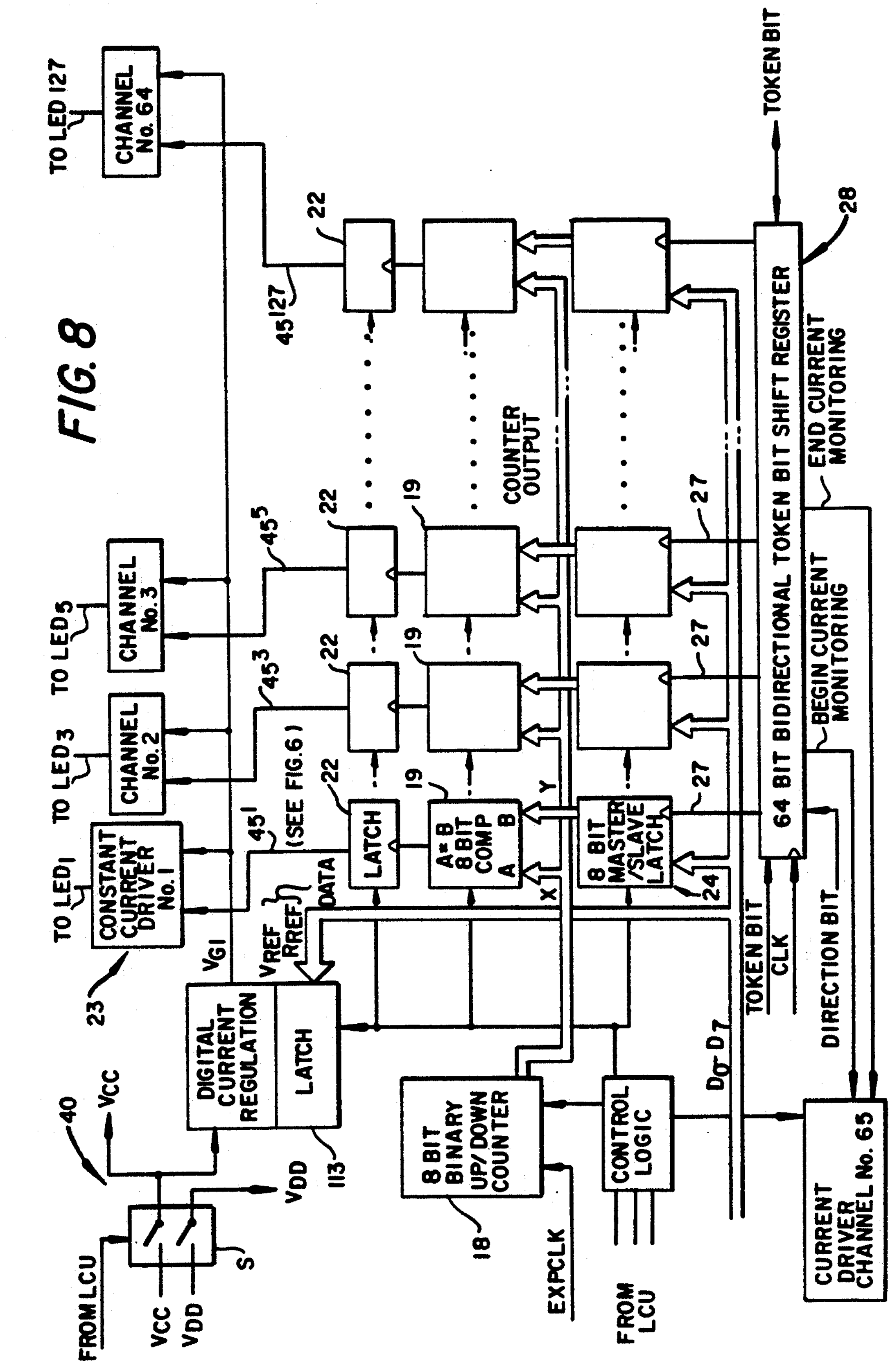
FIG. 8 is a block diagram of a driver chip for use on the printhead of FIG. 7.
Figure 9:
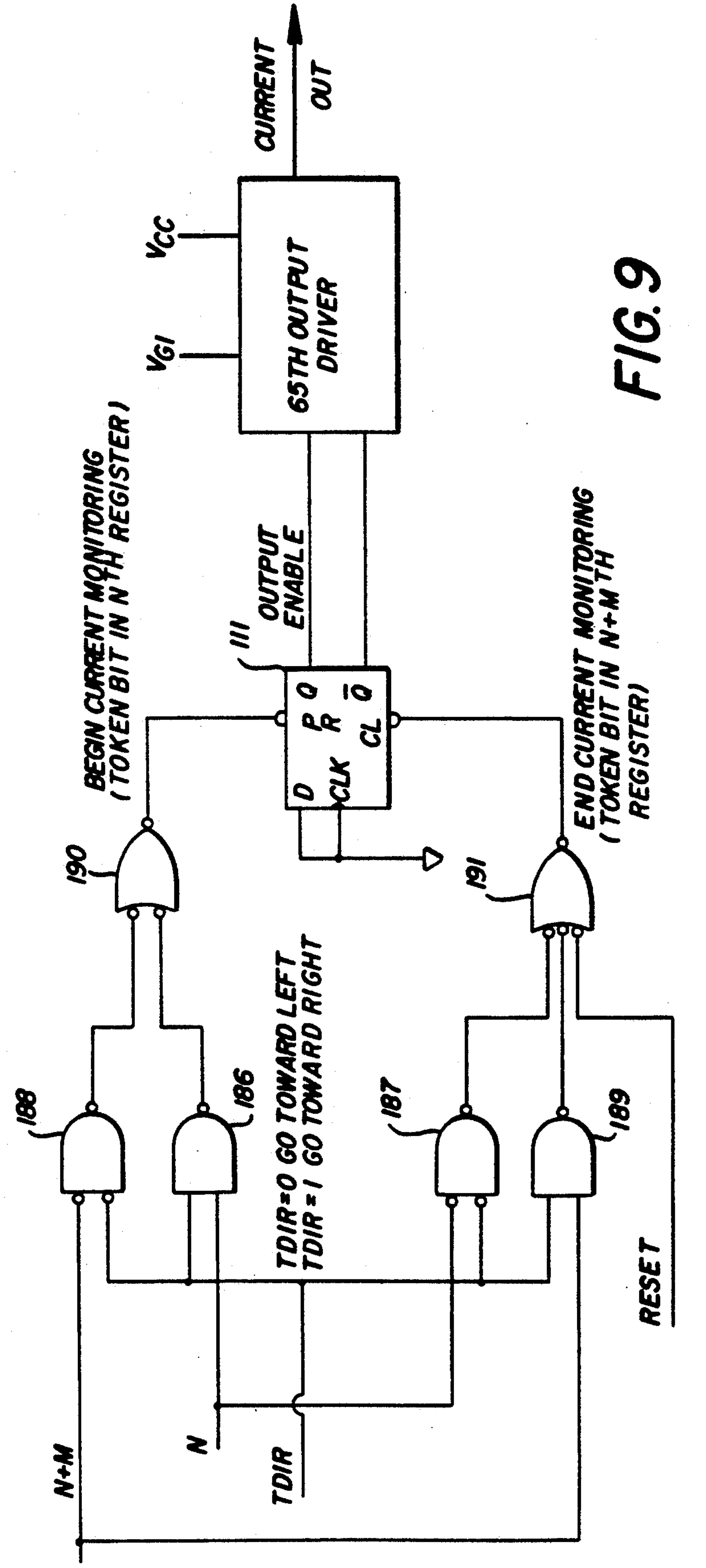
FIG. 9 is a block diagram of an extra driver channel or current monitor channel for the driver chip of FIG. 8.

Description will now be made of the embodiment of FIGS. 7–9 wherein similar numbers to that of the prior embodiment relate to similar structures. In this alternative embodiment, image data and recording of same is handled in a similar way to that described above and is in accordance also with the description of U.S. Pat. No. 4,746,941, the contents of which are incorporated herein by this reference. In this example, eight bits of image data are used instead of six but the principle of operation is similar using an 8-bit comparator for determining exposure duration. During recording of one line of image data by the printhead 20, the next line of data is sent down the data bus $D_0$–$D_7$ and is latched in consecutive order by the respective master-slave latch registers 24 in accordance with the presence of a token bit in a respective register. As noted above, the token bit is shifted down the 64-bit bidirectional token bit shift register 28 and image data on lines $D_0$–$D_7$ is latched in a respective latch register 24. The token bit then exits the shift register and is shifted into the shift register of the next driver chip. Current monitoring is also activated during a portion of the period that the token bit is present in the driver chip's token bit shift register. A signal from the LCU is used to generate current in the 65th driver channel. The means for activation of the 65th driver channel will now be described further with reference also to FIG. 9. A latch 111 coupled with the extra, or in this example the 65th, driver channel has its output enabled or say placed logic high in response to the location of the token bit in a specific stage (N) of the token bit shift register 28. The output of token bit register stage N is coupled via the logic gates 186, 190 and 187, 191, respectively, to the preset and clear inputs of latch 111. In response to this, current flows in the 65th channel of the driver chip 40 now containing the token bit in a similar way to that described for the prior embodiment. Current to the 65th driver channel (FIG. 6D) terminates when the token bit has moved a fixed number of stages (say M stages) down the token bit shift register 28 in this same driver chip 40. In response to the token bit reaching a particular stage, N+M, the latch (111) output is disabled or cleared. The output of token bit register stage N+M is coupled via the logic gates 188, 190 and 189, 191, respectively, to the preset and clear inputs of latch 111. As may be noted in FIG. 7, the outputs of all the current monitors or 65th channels of all the odd-numbered driver chips are connected in parallel to a current to voltage converter which may be similar to that described above. These outputs are multiplexed by multiplexer 106 with the similar outputs of the current monitors to the even-numbered driver chips. An A/D converter 89 converts the analog signal which is also related to the temperature of that driver chip (and approximates the temperature of the LED's driven by that driver chip) to a digital signal that is communicated over appropriate lines to the LCU. 4 The LCU, by keeping track of the counts of the token clock for use in shifting image data, knows which driver chip the token bit is located in and thus which driver chip's 65th channel is being activated at this time. Note that while data for recording the next line of pixels is being sent over bus lines $D_0$–$D_7$ and latched in appropriate master registers in response to the token bit, the previous line of pixels, whose data is stored in the slave registers of latches 24, is being printed by the LED's while the 65th channel driver channel is also activated. Note, too, that even though the token bit is shifted simultaneously down even and odd-numbered driver chips 40, for example, driver chips #1 and #2, or #3 and #4 . . . or #55 and #56, the LCU recognizes that for a certain part of the period for which a token bit is resident within a driver chip (and for which the 65th channel monitoring is activated) the monitored current input to the multiplexer 106 must be odd. For example, and with reference to FIG. 7, when the token bit is within registers #2 through #32 of the bidirectional 64 token bit shift register 28 of say driver chip #1, the LCU is programmed to consider the current monitored signal from the A/D converter 89 as representing the current in driver chip #1, even though the token bit is simultaneously also in the driver chip #2. However, because driver chips #1 and #2 are identical and due to the bidirectional feature of the token register 28, the token bit in register #2 moves from register #64 to register #1 so that when the token bit is in one of the registers #2 through #32 on driver chip #1, it is in one of the registers #63 through #33 on chip #2. Similarly, when the token bit is in one of the registers #32 through #2 on driver chip #2, it is also simultaneously in one of registers #33 through #63 on driver chip #1. Thus, the LCU recognizes that when the token has moved 33 clock pulses into a token shift register of a driver chip (but less than 64 clock pulses) the signals generated by the A/D converter to the LCU represent current to the LED's in a driver chip that is the even-numbered driver chip of the pair of driver chips having the token bit. Additionally, a select signal is provided by the LCU to multiplexer 106, which controls which of the current signals, odd or even, is to be sent to the LCU. The overall clock token count determines which odd and even pair of driver chips the token is in. If desired, the extra current to voltage converter and analog multiplexer may be omitted as in the printhead of FIG. 3.

Figure 7:
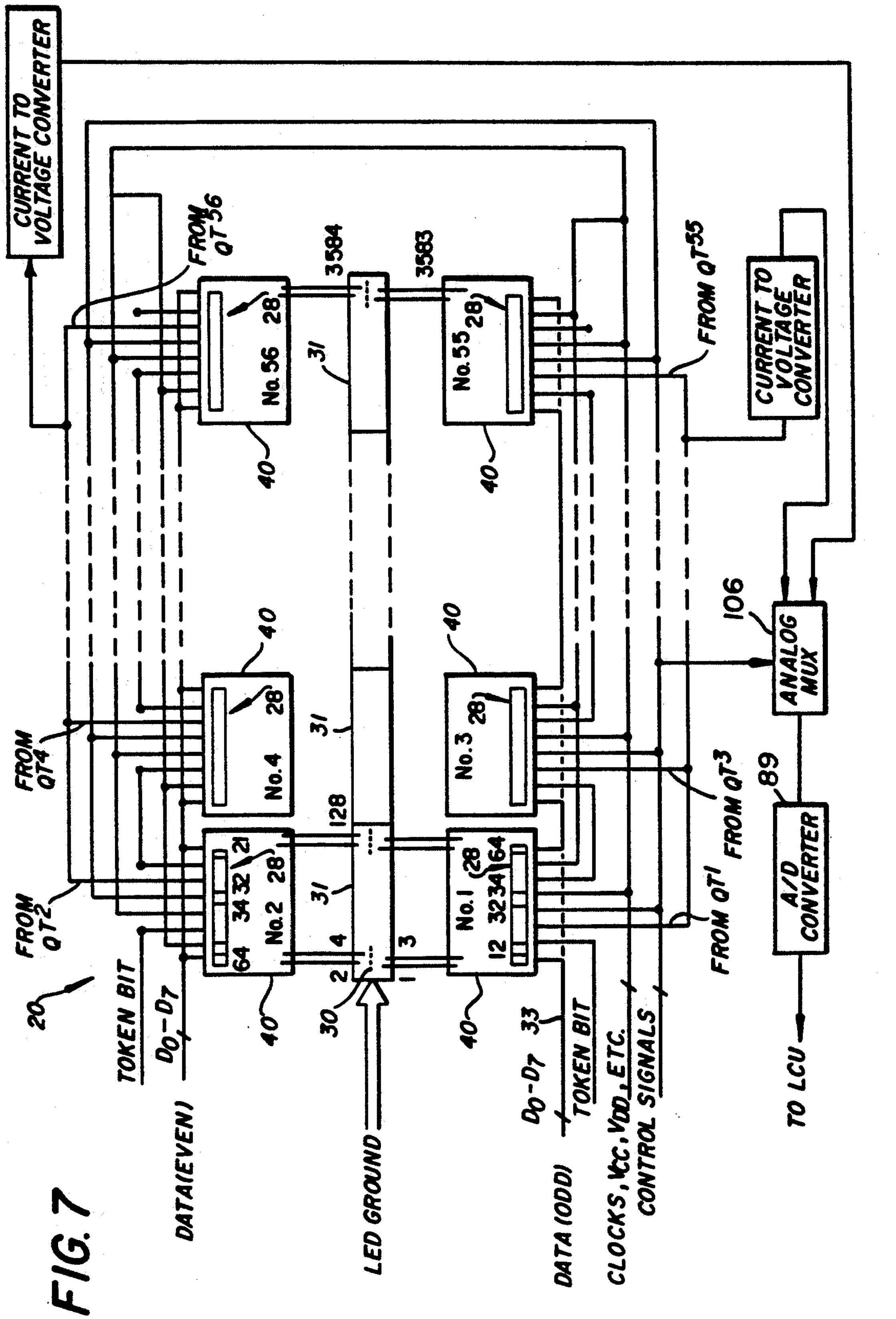
FIG. 7 is a block diagram of another embodiment of a printhead made according to the invention.
Figures 10, 13:
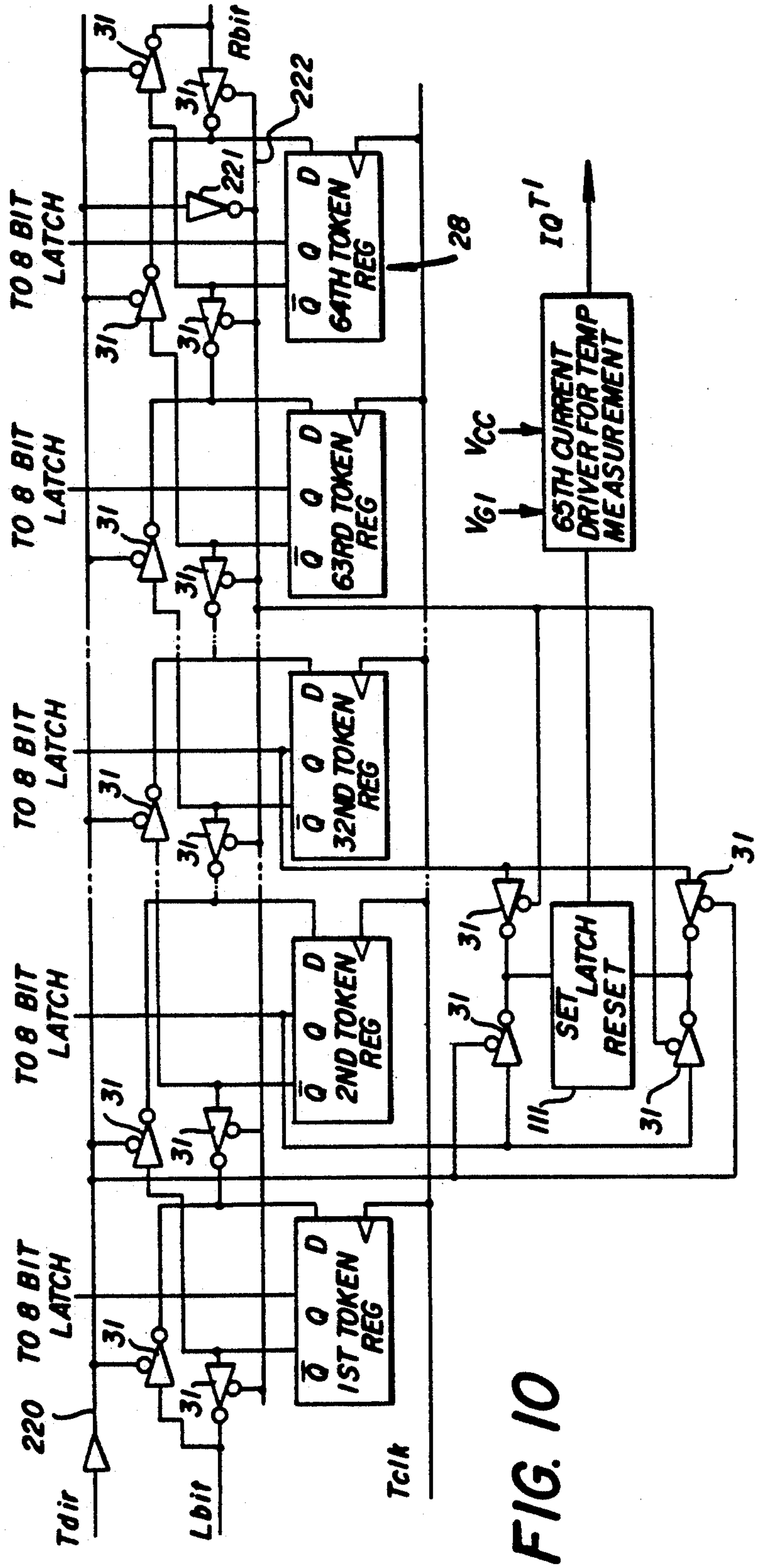
FIG. 10 is a schematic of a token bit register incorporated on the driver chip of FIG. 8.
FIG. 13 is a truth table illustrating operation of the modified driver chip of FIG. 11.

With reference now to FIG. 10, further details of the token bit register 28 of the embodiment of FIG. 7 are shown. A token direction signal (Tdir) biases line 220 at one logic level and through inverter 221, biases line 222 at an opposite logic level. Assume that the signal Tdir biases line 220 for transmission of the token bit that travels from left to right (Lbit) in FIG. 10. In such case, the tristate inverters 31 used for transmission of the right to left going token bit are disabled. The token bit is synchronized with pulses of the token clock (TCLK) and upon entering the driver chip, triggers the D input of the first token register of the token bit shift register to switch its outputs so that the Q output of the register is changed to enable the eight-bit latch 24 (FIG. 8) to latch the image data signals upon data bus lines $D_0$–$D_7$. Upon occurrence of the next clock pulse the first token register is reset and the token bit is shifted via a tristate inverter 31 from the $\overline{Q}$ output of the first token register to the D input of the second token register. The second token register now has its Q output such that image data signals on the image data bus will be latched by the appropriate latch register associated with $LED_3$. The change of the Q output of the second token register simultaneously sets latch 111 (FIG. 9) which triggers the 65th current channel (FIG. 6D) to enable transistor $Q_{71}$ to generate a current $IQ^{71}$ which is identical to that simultaneously being driven through the LED's that are enabled for recording the prior line of pixels. The current is monitored by the LCU via A/D converter 89 and in accordance with a program in the LCU the current is related to the temperature of the driver chip. This current is monitored until the token bit reaches the 32nd token register upon which event the Q output of this register resets latch 111. With movement of the token bit into the 33rd token register of driver chip #1, the LCU commences to monitor the current in the 65th driver channel of driver chip #2 as described above. As noted above, monitoring of the current is done first in driver chip #1 and then driver chip #2. The token bit then passes into driver chips #3 and #4 for monitoring the current in these chips as well as for latching of image data for these chips on lines $D_0$–$D_7$.

Figure 11:
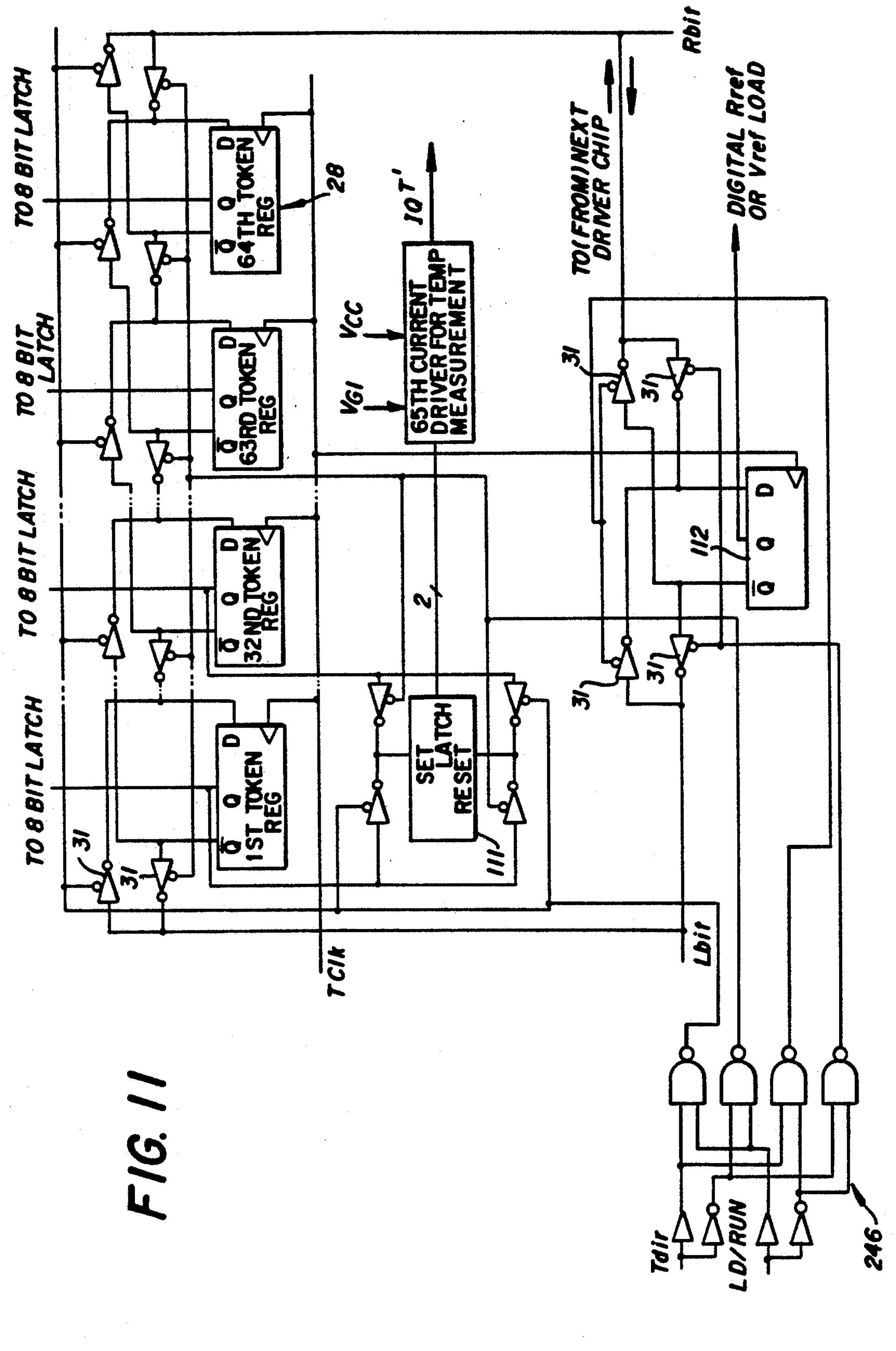
FIG. 11 is a schematic of a token bit register incorporated on another embodiment of a driver chip that is a modification of that of FIG. 8.
Figure 12:
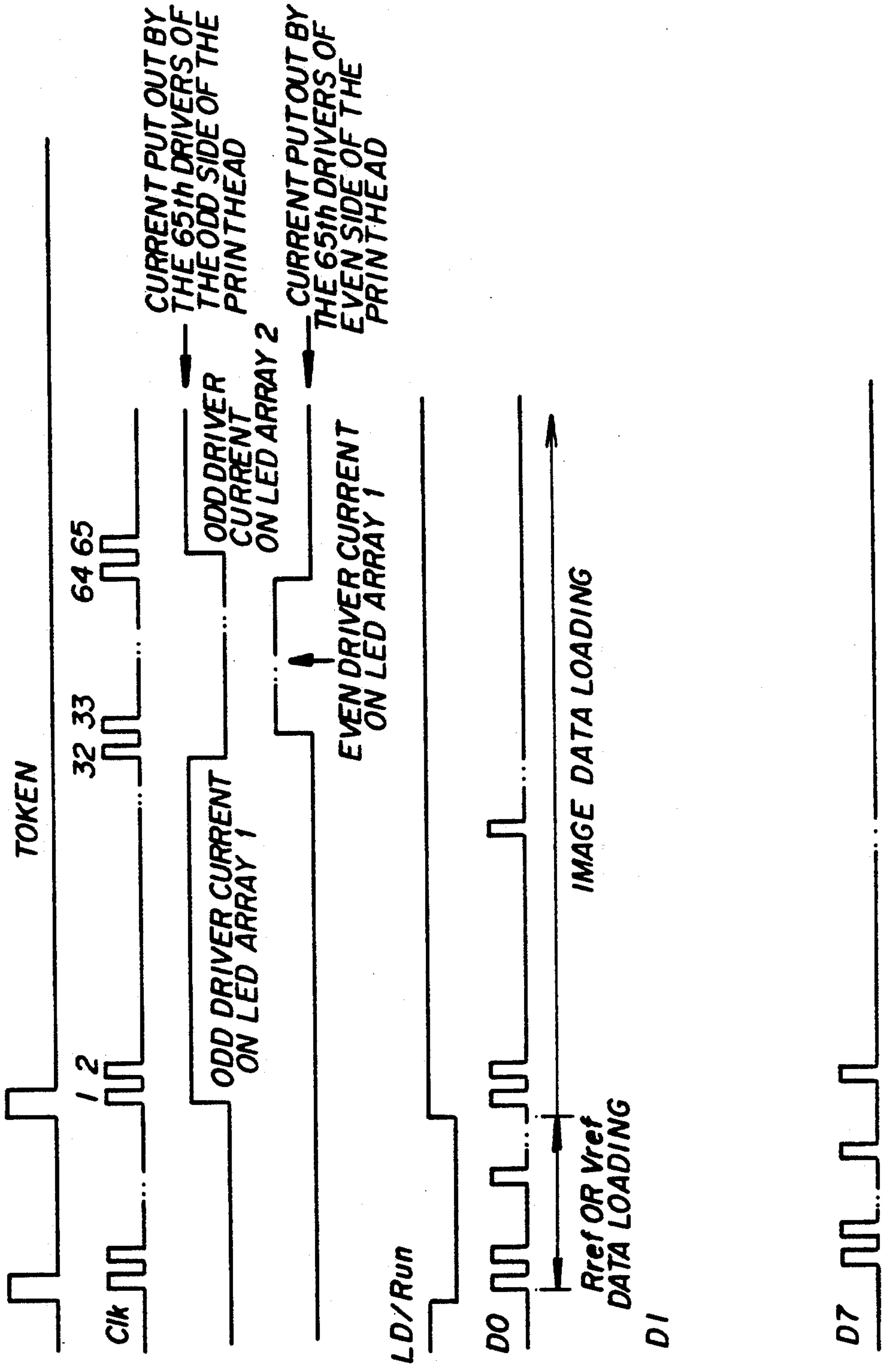
FIG. 12 is a time line illustrating the occurrence of various pulses on the driver chip of FIG. 11.

In FIGS. 11–13, an improvement over the circuit of FIG. 10 is illustrated wherein in addition to use of the token bit for simultaneously controlling distribution of image data and use in monitoring current on driver chip temperature, there is also provided the use of the token bit for controlling the change of digital current regulation data in the driver chip just prior to recording each line of pixel data. In the embodiments described above, $R_{REF}$ or $V_{REF}$ digital current regulation data was provided during interframe or other non-production periods when no printing was occurring. In the embodiment now to be described, the digital current regulation data is provided during printing. This allows current not only to be monitored in real time but also to be changed more promptly as required. As the same data bus is used to carry both image data signals and current regulation signals, a logic circuit 246 is provided in each driver chip to allow the circuit to discriminate between image data signals that control the pulsewidth time duration exposures used for recording the next row of image pixels or current regulation data signals which control the level of current to each LED activated during recording of the next row of pixels.

Data for adjusting $R_{REF}$ is provided by the LCU based upon the temperature-related current signals generated by each of the respective current drivers for the 65th current channel of each driver chip. In response to these current signals, the LCU calculates a new 8-bit digital word for each driver chip to control the respective level of current in that driver chip. Simultaneously, a token bit is also generated on line Lbit and a control line labelled LD/Run is adjusted to a logic low level. In addition, the line $T_{dir}$ is made a logic high level so that the logic circuit 246 has the four output lines thereof at suitable logic levels to disable the tristate inverters 31 associated with the image data token registers as well as disable the register 111 for disenabling the 65th current driver circuit. In response to the token bit input to the D input of a register 112, the Q output of this register changes to provide a load signal to the latch register 113 (FIG. 8) for loading current regulation data carried on lines $D_o$–$D_7$. The $\bar{Q}$ output of latch 112 is output to the Lbit input of the next driver chip so that with the next operation of the token clock, the output of $\bar{Q}$ changes. This provides the needed token pulse to the D input of the register 112 of the next driver chip. The LCU at this time has also changed the current regulation data upon lines $D_o$–$D_7$ to be appropriate for proper regulations of current in this next driver chip. Note that because there are separate data lines for odd and even-numbered driver chips, the token bit is simultaneously applied to odd and even-numbered driver chips so that current regulation data is provided simultaneously to an odd-numbered driver chip as well as to an even-numbered driver chip. After respective current regulation data is distributed to all the driver chips, the LCU changes the LD/Run line to a logic high level and a new token bit is sent by the LCU to the first driver chips (odd and even) on the printhead for latching the image data signals on data bus lines $D_o$–$D_7$. With this token bit the register 111 will be set by the token bit to commence operation of the 65th channel current driver as described for the embodiment of FIGS. 7–9. Another difference in the embodiment of FIG. 11 is the use of the first token register (rather than the second token register) to commence drive to the 65th channel current driver. Other token registers may be designed for determining when the 65th channel is to be operated. It may be desirable for the LCU to have a small programmed delay as to when the LCU actually reviews the current data from the A/D converter 89 (FIG. 7). This delay will allow the driver current in the 65th current channel to stabilize.

ADVANTAGES

An improved printer apparatus has been described which provides for fine control over adjustments of current to the recording elements as well as for correction of pulsewidth durations as required for temperature compensation. There is also ensured that destructive current levels will not be generated when current to the recording elements are adjusted. The use in the embodiment of FIGS. 7–9 and 11–13 of the token bit in the token register while the token bit is also defining which latch register is to secure image data coming over the image data bus $D_o$–$D_7$ allows current monitoring to be done during printing rather than waiting for say an interframe or other non-productive period. Thus, in response to the current (and temperature) related data obtained from each driver chip, prompt adjustment may be made by the LCU to terminate current to the LED's if an inappropriate current level is detected. In addition, if the current level is within acceptable limits, prompt uniformity control is provided by adjusting or fine tuning image data to that driver chip. Image data from RIP 16 (FIG. 2) is a multibit digital signal indicating the level of grey of a pixel to be recorded by a particular LED. However, in response to a signal from the LCU regarding correction for uniformity, this multibit data signal may be adjusted to correct for say the decrease in light output by the LED's driven by this driver chip due to the higher temperatures of the LED array chip driven by this driver chip. In this regard, reference is made to U.S. application Ser. No. 07/290,002, the contents of which are incorporated herein by this reference. As may be noted in FIG. 2, the odd and even data from RIP 16 may be first modified by a correction PROM **16*a* before this data is sent to the printhead. The correction PROM stores correction information so that an 8-bit word from RIP 16 is converted to a new 8-bit word that is corrected based on the temperature of the printhead to adjust pulsewidth duration. The LCU signals the PROM as to the correction factor based on the temperature related data provided in reading the 65th driver current channels. Thus, adjustability of the printhead to provide for uniformity is advantageously provided in several ways namely adjustment of current through use of current regulation data signals $V_{REF}$ and/or $R_{REF}$) by using an image data bus during say an interframe to adjust a bias current $I_{CHIP\,BIAS}$ (FIGS. 6A, B, C and D) to the constant current driver circuits and by use of the adjustment to image data during production periods. In the embodiments of FIGS. 7–10 and 11–13, the adjustments of current are provided in a manner similar to that described for the embodiment of FIGS. 1–6**. Control logic on each driver chip receives a signal indicating that it is to latch current regulation data into say an 8-bit latch which is used for local bias; i.e., this signal is particular to this driver chip. The driver chip may also receive a global bias signal $V_{REF}$ that is received commonly by all driver chips. This signal $V_{REF}$ may be analog or digital.

A further improvement is provided in the embodiment of FIGS. 11–13 demonstrating that data for providing further fine tune adjustment of current can be provided during each line of recording.

While the preferred embodiment has been described in terms of MOSFET transistors that have their respective gates controlled, other devices providing an equivalent function such as bipolar or other gate controlled devices are also contemplated. Where bipolar transistors are used, transistor geometry or doping levels to respective transistors may be modified to provide the current scaling characteristics described herein.

Although the invention has been described with respect to embodiment wherein an extra current driver channel is provided in each driver chip, the invention in its broader aspect contemplates that the current may be sensed in the driver channels of the recording elements.

The invention has been described in detail with particular reference to preferred embodiments thereof, but it will be understood that variations and modifications can be effected within the spirit and scope of the invention.

What is claimed is:

1. A non-impact printer apparatus comprising:
- a recording head having a plurality of recording elements for recording on a recording medium;
- a plurality of driver chips;
- driving means incorporated on each of said driver chips, the driving means including a plurality of current driving channels or selectively driving a number of said recording elements in accordance with respective image data signals, each said and further including an extra current driving channel including means not associated with said recording elements for generating a monitorable current in said extra driving channel related to contents sent to said number of said recording elements; and
- monitoring means for monitoring said monitorable current in one of the extra current driving channels, said monitoring means being responsive to a signal to select which said monitorable current is being monitored.

2. The printer apparatus of claim 1 and including means for shutting down said currents to said recording elements in response to sensing of a current level that is inappropriate for recording.

3. The printer apparatus of claim 1 and wherein each said driving means is responsive to a current monitored in a respective one of said extra current driving channels for adjusting said constant level of current to said number of said recording elements.

4. The printer apparatus of claim 1 and including means associated with a plurality of said driver chips for defining a multistage shift register means that is responsive to a token bit signal in a particular stage for selecting which said monitorable current is being monitored.

5. The printer apparatus of claims 1, 2, 3 or 4 and wherein each said driving means comprises a current mirror having a master circuit and the current driving channels are slaves of said master circuit.

6. The printer apparatus of claim 5 and including a plurality of digitally addressable transistors for changing a level of current in said master circuit.

7. The printer apparatus of claims 1, 2, 3 or 4 and including image data bus means for carrying image data signals;
- each said driving means including respective data register means associated with each of said recording elements for storing said image data signals;
- means for connecting said data bus means to said data register means; and
- data register enablement means, including a multistage token bit shift register, outputting sequentially at respective stages of the multistage token bit shift register a token bit signal to sequentially enable a respective data register means to store image data signals.

8. The printer apparatus of claim 7 and wherein each of said driver chips includes a said data register enablement means;
- the driver chips are located at opposite sides of an array of recording elements; and
- means for shifting token bit signals simultaneously down token bit shift registers of opposing driver chips and means responsive to a position of one of the token bit signals in a particular stage for controlling monitoring of current from one of two opposing driver chips containing a said one of the token bit signals.

9. The printer apparatus of claim 8 and wherein the recording elements are light-emitting diodes.

10. The printer apparatus of claim 8 and including means for adjusting image data signals for determining durations of recording by said recording elements in response to a level of current monitored in one of a said extra current driving channels.

11. The printer apparatus of claim 1 and including means for adjusting said image data signals in response to a level of current monitored in one of said extra current driving channels.

12. The printer apparatus of claim 11 and wherein a portion of said multistage shift register means is incorporated within each of said driver chips and;
- the driver chips are located at opposite sides of an array of recording elements; and further comprising
- means for shifting token bit signals simultaneously down the multistage shift register means of opposing driver chips and means responsive to a position of a token bit signal in a particular stage to select monitoring of current from one of two opposing driver chips containing token bit signals.

13. A non-impact printer apparatus comprising:
- a recording head having a plurality of recording elements for recording on a recording medium,
- driving means, including a plurality of current driving channels, for selectively driving said plurality of recording elements with a constant level of current and with respective controlled durations of recording in accordance with respective image data signals;
- means for generating a current in an extra current driving channel; means for sensing the current in said extra channel; and
- means for adjusting image data signals to adjust durations of recording by the recording elements in response to the level of the current sensed in the extra channel.

14. The printer apparatus of claim 13 and wherein said driving means includes means for adjusting said constant level of current to recording elements in response to the current level sensed.

15. The printer apparatus of claims 13 or 14 and wherein the driving means comprises a current mirror having a master circuit and the current driving channels are slaves of said master circuit.

16. The printer apparatus of claim 15 and including a plurality of digitally addressable transistors for changing a level of current in said master circuit.

17. The printer apparatus of claims 13 or 14 and including image data bus means for carrying image data signals;

said driving means including respective image data register means associated with each of said recording elements for storing said image data signals;

means for connecting said data bus means to said image data register means;

means for generating a token bit signal; and data register enablement means, including a multistage token bit shift register, outputting sequentially at respective stages of the multistage token bit shift register a token bit signal to sequentially enable a respective image data register means to store image data signals.

18. The printer apparatus of claim 17 and including a plurality of driver chips, each of said driver chips including a said driving means, and the apparatus including means responsive to a token bit signal to select which of said current, in said current driving channels is being sensed.

19. The printer apparatus of claim 18 and wherein each of said driver chips includes a said data register enablement means and the drive chips are located at opposite sides of an array of recording elements; and further comprising means for shifting token bit signals simultaneously down the token bit shift register of opposing driver chips; and means responsive to a position of one of the token bit signals in a particular stage for selecting the sensing of said current from one of two opposing driver chips containing token bit signals.

20. The printer apparatus of claim 19 and wherein the recording elements are light-emitting diodes.

21. A driver chip for use on a non-impact printer apparatus having a plurality of recording elements, the driver chip comprising;

driving means, including a plurality of current driving channels, selectively generating currents for driving said plurality of recording elements in accordance with respective image data signals; said driving means further including an extra current driving channel not associated with a recording element that generates a monitorable current related to the currents for driving said plurality of recording elements;

a plurality of image data lines carrying image data signals;

respective image data register means associated with each of said recording elements for storing said image data signals;

means for connecting said plurality of lines to said data register means;

data register enablement means, including a multistage token bit shift register, outputting sequentially at respective stages of the multistage token bit shift register token bit signals to sequentially enable a respective image data register means to store image data signals; and means responsive to a token bit signal for activating the extra current driving channel.

22. The driver chip of claim 21 wherein the driving means includes a master circuit and the current driving channels are slaves of said master circuit and the driving means further includes a plurality of digitally addressable transistors for changing a level of current in said plurality of current driving channels by adjusting a current in the master circuit.

23. The driver chip of claim 22 and including means for digitally addressing the digitally addressable transistors with current regulation signals from at least one of said image data lines.

24. A non-impact printer apparatus comprising:

a recording head having a plurality of recording elements for recording on a recording medium, driving means, including a current mirror having a master circuit and a plurality of current driving channels that are slaves of said master circuit, for selectively driving said plurality of recording elements in accordance with respective image data signals and in accordance with a current related to a current in said master circuit, the master circuit including a plurality of digitally addressable transistors for changing a level of the current in said master circuit, said driving means further including an extra current driving channel not associated with a recording element for generating a current related to currents to said recording elements; and means for monitoring the current in said extra channel and generating a digital signal that selectively enables selected ones of said transistors to control the level of current in said master circuit.

25. The printer apparatus of claim 24 and including a plurality of and wherein each of said driver chips includes a said driving means, and the apparatus further includes means for selecting which of said currents in said extra current driving channels is monitored.

26. The printer apparatus of claim 24 and including a plurality of said extra driving channels, and the apparatus further includes means for selecting which of said currents in said extra current driving channels is monitored.

27. A non-impact printer apparatus comprising:

a recording head having a plurality of recording elements for recording on a recording medium, driving means, including a plurality of current mirrors, each of said current mirrors having a master circuit and a plurality of current driving channels that are slaves of said master circuit, for selectively driving said plurality of recording elements with currents in accordance with respective image data signals and in accordance with a current in said master circuit, said driving means further including a plurality of extra current driving channels not associated with a recording element for generating in each of the extra channels a current related to the currents to said recording elements; and means for monitoring the current in each of said extra channels and selecting which said current is being monitored.

28. A non-impact printer apparatus comprising:

a recording head having a plurality of recording elements for recording on a recording medium, a plurality of driver chips;

a driving means incorporated on each of said driver chips for selectively driving said plurality of recording elements in accordance with respective image data signals, each said the driving means including a plurality of current driving channels, monitoring means for monitoring a monitorable current in each of said driver chips, said monitoring means including a token bit shift register and said monitoring means being responsive to a token bit signal output from said token bit shift register to select which said monitorable current is being monitored.

29. The printer apparatus of claim 28 and wherein each of said driver chips includes a multistage shift register that forms a part of said token bit shift register and means for shifting of the token bit signal into one stage of said multistage shift register to determine when monitoring of the current in said begins by said monitoring means and shifting of the token bit signal into another stage of said multistage register to determine when monitoring of the current ends.

* * * * *